(12) United States Patent
Franklin et al.

(10) Patent No.: US 7,355,527 B2
(45) Date of Patent: Apr. 8, 2008

(54) SYSTEM AND METHOD FOR PARKING INFRACTION DETECTION

(76) Inventors: William Franklin, 15 Dawson Crescent, Aurora, Ontario (CA) L4G 4T6; Jeff Bethune, 14 Maplecrest Lane, Brantford, Ontario (CA) N3R 7V1; Raphael Leung, 65 Rosedale Heights Drive, Thornhill, Ontario (CA) L4T 4T8; Antonio Nucaro, 61 Moonstone Place, Woodbridge, Ontario (CA) L4L 2G2; Lyle Franklin, 14 Durrell Court, Hamilton, Ontario (CA) L9A 5H5; Alex Bosanac, 3501-1001 Bay St., Toronto, Ontario (CA) M5S 3A6

( * ) Notice: Subject to any disclaimer, the term of this patent is extended or adjusted under 35 U.S.C. 154(b) by 248 days.

(21) Appl. No.: 11/328,113

(22) Filed: Jan. 10, 2006

(65) Prior Publication Data

US 2007/0029825 A1 Feb. 8, 2007

Related U.S. Application Data

(60) Provisional application No. 60/642,102, filed on Jan. 10, 2005, provisional application No. 60/679,228, filed on May 10, 2005.

(51) Int. Cl.
*G08G 1/017* (2006.01)

(52) U.S. Cl. ............ 340/937; 340/933; 705/417; 382/104

(58) Field of Classification Search ............ 340/932.2, 340/933, 937, 425.5; 348/148, 159; 705/418; 382/104, 105; 235/375
See application file for complete search history.

(56) References Cited

U.S. PATENT DOCUMENTS

| 5,263,118 A | 11/1993 | Cornelison |
| 5,740,050 A | 4/1998 | Ward |
| 5,745,052 A | 4/1998 | Matsuyama et al. |

(Continued)

OTHER PUBLICATIONS

The Golden Ears Bridge Greater Vancouver Transportation Authority, Contract 0214-45 The Golden Ears Bridge Tolling Technology/Operations Technical Advisor, Toll Technology Assessment Final Report, Jan. 20, 2005, pp. 1-63.

(Continued)

*Primary Examiner*—Jeffery Hofsass
*Assistant Examiner*—Hongmin Fan
(74) *Attorney, Agent, or Firm*—Bereskin & Parr

(57) ABSTRACT

The invention relates to a system and method for detecting parking infractions. It comprises computing one or more measurements associated with a stationary object found at a first location; classifying the stationary object as being representative of a vehicle parked at the first location based on the one or more measurements associated with the stationary object; capturing one or more images of the vehicle parked at the first location; processing the one or more images of the vehicle to extract one or more present vehicle identifiers associated with the vehicle, and recording a time the one or more images were taken, a co-ordinate set associated with the first location and the one or more identifiers associated with the vehicle; determining a time duration for which parking is allowed at the first location; and comparing the present vehicle identifiers with previously recorded vehicle identifiers associated with the first location to determine if the vehicle has been parked at the first location for a period exceeding the time duration.

15 Claims, 19 Drawing Sheets

U.S. PATENT DOCUMENTS

| | | |
|---|---|---|
| 5,845,268 A | 12/1998 | Moore |
| 5,905,247 A | 5/1999 | Ilen |
| 6,026,367 A | 2/2000 | Hjelmvik |
| 6,047,234 A | 4/2000 | Cherveny et al. |
| 6,081,206 A | 6/2000 | Kielland |
| 6,102,285 A | 8/2000 | Elias |
| 6,229,445 B1 | 5/2001 | Wack |
| 6,233,523 B1 | 5/2001 | Sood |
| 6,526,352 B1 | 2/2003 | Breed et al. |
| 6,559,776 B2 | 5/2003 | Katz |
| RE38,626 E | 10/2004 | Kielland |
| 6,832,206 B1 | 12/2004 | Chelnik |
| 6,885,311 B2 | 4/2005 | Howard et al. |
| 6,885,312 B1 | 4/2005 | Kirkpatrick |
| 6,898,495 B2 | 5/2005 | Tanaka et al. |
| 6,917,307 B2 | 7/2005 | Li |
| 6,927,700 B1 | 8/2005 | Quinn |
| 6,943,726 B2 | 9/2005 | Schneider |
| 6,946,973 B1 | 9/2005 | Yanda |
| 6,948,729 B2 | 9/2005 | Zalila et al. |
| 2001/0020961 A1 | 9/2001 | Pauschinger |
| 2001/0035830 A1 | 11/2001 | Rosenberg et al. |
| 2002/0008639 A1 | 1/2002 | Dee |
| 2002/0109610 A1 | 8/2002 | Katz |
| 2002/0145664 A1 | 10/2002 | Jones |
| 2003/0159036 A1 | 8/2003 | Walmsley et al. |
| 2003/0208352 A1 | 11/2003 | Lee |
| 2004/0254900 A1 | 12/2004 | Reinhard |
| 2005/0002544 A1 | 1/2005 | Winter et al. |
| 2005/0068196 A1 | 3/2005 | Marin |
| 2005/0104723 A1 | 5/2005 | Mandy |
| 2005/0149384 A1 | 7/2005 | Odinak |
| 2005/0168352 A1 | 8/2005 | Tomer |
| 2005/0190076 A1 | 9/2005 | Howard et al. |
| 2005/0228715 A1 | 10/2005 | Hartig et al. |
| 2005/0237225 A1 | 10/2005 | Jesadanont et al. |

OTHER PUBLICATIONS

Booz Allen & Hamilton, Intelligent Transportation Systems Field Operational Test Cross-cutting Study, Commercial Vehicle Operations—Roadside, Nov. 1998, pp. 1-25.

| Street Name 120 | Street Co-ordinates 122 | Locations of Parking Areas 124 | Locations of Non-Parking Areas 126 | Parking Restrictions 128 |
|---|---|---|---|---|
| | | | | |

50 - Parking Location Database

FIG. 8

52 - Fee Payment Database

| Name/Details 200 | Unique ID 202 | Transponder ID 204 | Payment 206 | Status 208 |
|---|---|---|---|---|
| | | | | |

*FIG. 10*

54 - Transaction Database

| Transponder ID 220 | Location 222 | Time 224 | Status 226 |
|---|---|---|---|
| | | | |

*FIG. 11*

| Location 250 | $T_1$ 254 | $T_1$ Identifiers 256 | $T_2$ 258 | $T_2$ Identifiers 260 | Time Duration 262 | Transponder 264 |
|---|---|---|---|---|---|---|
| | | | | | | |

56 Vehicle Tracking Database

SYSTEM AND METHOD FOR PARKING INFRACTION DETECTION

This application claims priority from U.S. Provisional Application Ser. No. 60/642,102 filed Jan. 10, 2005, and U.S. Provisional Application Ser. No. 60/679,228 filed May 10, 2005.

FIELD OF THE INVENTION

The invention relates generally to the field of parking enforcement, and more specifically to systems and methods for the automatic detection of parking infractions.

BACKGROUND OF THE INVENTION

Parking regulations are enacted for multiple purposes. Purposes for which parking regulations are enacted and enforced include, generating revenue for the appropriate authorities, easing congestion on roadways, facilitating vehicle turnover and hence improving foot traffic for business owners, and for controlling parking on residential streets.

By regulating the parking of vehicles on roadways, the appropriate governing authorities attempt to allow for a more orderly flow of traffic. Many authorities allow for parking on roadways at certain times of the day and or week. Motorists are often required to pay a fee to park on the roadway at allowable times, which is usually based on an hourly fee structure. Fee for use systems generally rely on parking meter technology. Parking meters are generally installed so that they are located beside each parking spot that is associated with a fee for use system. A motorist rents time from the parking meter by adding currency to the meter. The parking meter then displays the amount of time for which a vehicle may be parked in a specific parking space. While many people have grown accustomed to the use of parking meters, parking meters are difficult to upkeep and expensive to install, as each parking space requires a parking meter.

Many city authorities have begun to use other technologies to replace parking meters. One such technology involves the use of a user purchasing a ticket from a centralized machine that may be found at specific locations near a group of parking spaces. When the appropriate currency is deposited into the machine, the centralized machine prints a ticket, which sets out the time until which a vehicle may parked in that location. The motorist displays the parking ticket in the vehicle such that it is visible to a parking enforcement officer.

In order to enforce fee for use systems, parking enforcement officers are relied upon. The parking enforcement officer monitors each vehicle parked in each parking space, by either checking the parking meter, or the parking ticket displayed. This requires a great deal of manual effort, and the parking enforcement officer's efforts are often hampered by weather conditions, leaving the enforcement officer prone to injury as they are continuously walking between vehicles. The use of parking enforcement officers is also inefficient, as a parking enforcement officer is only able to cover a limited number of cars in a given shift.

Along with areas in which city authorities allow parking based on a fee for use system, there are areas where city authorities allow parking during certain time periods of the day or week for limited durations. These areas may be low-density areas, such as residential areas, or other areas that do not warrant the expense associated with setting up and administering a fee for use system. However, parking in these areas must also be regulated to ensure for ease of traffic flow and to partially generate revenue. In areas that allow for parking for limited durations only, parking enforcement officers administer the regulation of parking enforcement in these areas. As there is generally no fee associated with use of these parking areas, the parking enforcement officers will monitor the length of time for which a vehicle is parked in order to determine whether the allowable time period has been exceeded. One such method of monitoring the length of time for which a vehicle is parked, involves the use of a method knows as "wheel chalking". Wheel chalking involves the use of temporary marks that are made by chalk on the tire of the vehicle and or the roadway. The parking enforcement officer returns to the vehicles that has had its wheel (tire) chalked after a set period of time (usually longer than the allowable parking duration) and determines, based on the chalk marks, whether the vehicle has been moved. If the enforcement officer determines that the vehicle has not been moved, and has therefore exceeded the allowable parking duration, the enforcement officer issues a ticket. The process by which an officer determines whether a vehicle has moved is very labour intensive and inefficient, and only a few cars may be monitored regularly.

As a result, automated mechanisms have been developed to determine whether a vehicle is parked in the same location as it previously was. Such automated mechanisms in order to determine the identity of the vehicle rely on the recognition of the vehicle's license plates.

License plate recognition is prone to be inefficient for many reasons. License plate recognition involves taking images of the license plate and is subject to poor image resolution as the license plate may be too far away or at too acute of an angle from the camera taking the picture. Poor lighting conditions and reflections are two other reasons why license plate recognition proves to be an inefficient method to rely on when attempting to uniquely identify vehicles. These difficulties when combined with the natural dirt, sleet or snow that may cover the license plate, make the unique identification of vehicles that much more difficult. Also, many motorists attempt to devise methods of disguising their license plates by not placing them in the proper location, or by placing reflective coatings on them that are designed to distort images that are taken of these plates.

Therefore, there is a need for an improved system and method for detecting parking infractions.

SUMMARY OF THE INVENTION

In accordance with a first aspect of the invention, there is provided a method for the automated detection of parking infractions. The method comprises computing one or more measurements associated with a stationary object found at a first location; classifying the stationary object as being representative of a vehicle parked at the first location based on the one or more measurements associated with the stationary object; capturing one or more images of the vehicle parked at the first location; processing the one or more images of the vehicle to extract one or more present vehicle identifiers associated with the vehicle, and recording a time the one or more images were taken, a co-ordinate set associated with the first location and the one or more identifiers associated with the vehicle; determining a time duration for which parking is allowed at the first location; and comparing the present vehicle identifiers with previously recorded vehicle identifiers associated with the first location to determine if the vehicle has been parked at the first location for a period exceeding the time duration.

In accordance with a second aspect of the invention, there is provided a method for the automatic detection of parking infractions. The method comprises computing one or more measurements associated with a stationary object found at a first location; classifying the stationary object as being representative of a vehicle parked at the first location based on the one or more measurements associated with the stationary object; capturing one or more images of the vehicle parked at the first location; processing the one or more images of the vehicle to extract one or more present vehicle identifiers associated with the vehicle, and recording a time the one or more images were taken, a co-ordinate set associated with the first location and the one or more identifiers associated with the vehicle; determining whether parking at the first location is valid only when the vehicle has an electronic permit; and scanning the vehicle parked at the first location to determine whether the vehicle has an electronic permit.

In accordance with a third aspect of the invention, there is provided a system for the automatic detection of parking infractions. The system comprises means for performing the steps of computing one or more measurements associated with a stationary object found at a first location; classifying the stationary object as being representative of a vehicle parked at the first location based on the one or more measurements associated with the stationary object; capturing one or more images of the vehicle parked at the first location; processing the one or more images of the vehicle to extract one or more present vehicle identifiers associated with the vehicle, and recording a time the one or more images were taken, a co-ordinate set associated with the first location and the one or more identifiers associated with the vehicle; determining a time duration for which parking is allowed at the first location; and comparing the present vehicle identifiers with previously recorded vehicle identifiers associated with the first location to determine if the vehicle has been parked at the first location for a period exceeding the time duration.

BRIEF DESCRIPTION OF THE DRAWINGS

For a better understanding of embodiments of the systems and methods described herein, and to show more clearly how they may be carried into effect, reference will be made by way of example, to the accompanying drawings in which:

FIG. 8 is a diagram illustrating the fields of the parking locations database;

FIG. 10 is a diagram illustrating the fields of the fee payment database;

FIG. 11 is a diagram illustrating the fields of the transaction database;

FIG. 12 is a diagram illustrating the fields of the vehicle tracking database;

FIG. 20 is a screen shot of an exemplary embodiment of a citation issuance screen.

DETAILED DESCRIPTION OF THE INVENTION

Figure 1:
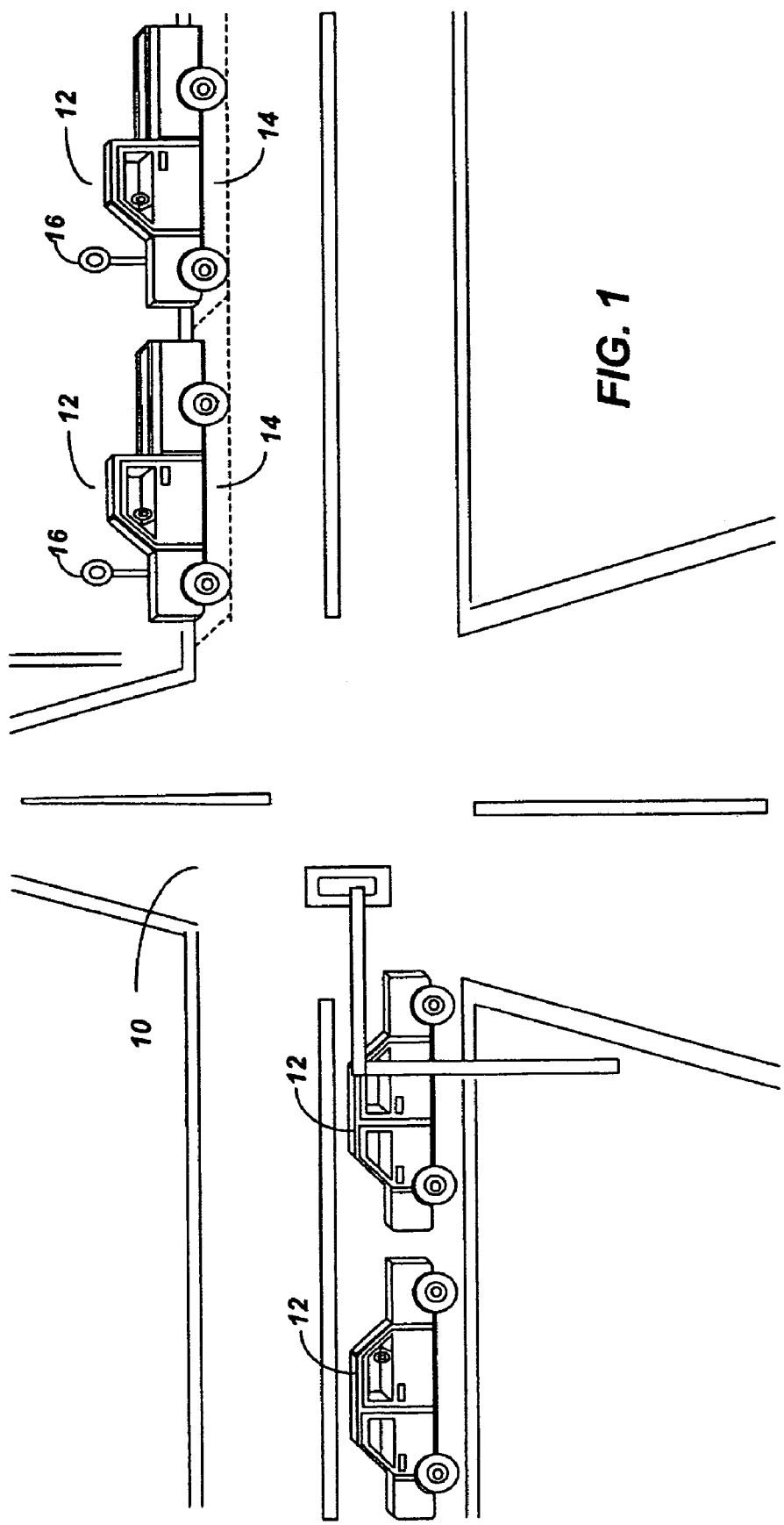
FIG. 1 is a block diagram illustrating vehicles parked on a street.

Reference is now made to FIG. 1, where a diagram illustrating vehicles parked on a street is shown. FIG. 1 illustrates a roadway 10, upon which vehicles 12 are driven, and parked in parking spaces 14. The term roadway 10 is used to refer to any transportation route upon which a vehicle 12 may be driven and parked. Parking spaces 14 as shown in FIG. 1 are used to refer to the designated areas upon a roadway where parking is allowed. The parking space 14 may be used based on the respective rules that govern the parking of vehicles 12. The parking regulations may specify that the parking spaces may be occupied only at certain times of the day, or occupied at certain times of the day based on a fee for use system. Also, shown in FIG. 1, is a parking meter 16. The parking meter 16 provides a mechanism by which parking enforcement authorities may administer parking regulations. The parking meter 16 allows motorists to purchase an amount of time by entering money into the meter, which will allow them to use the parking space 14 for a specified amount of time. Alternatively, motorists may purchase an amount of time to use a parking space 14 from a parking meter ticket station, where motorists may purchase an amount of time from a station, which then dispenses a ticket, that the motorists then displays on their vehicle. The ticket will generally state the date and time the ticket was purchased, and the time until which the motorist is allowed to use the parking space 14.

Parking may be regulated on a roadway through various other means, aside from a fee for use system. For example, the parking regulations in force may stipulate that the parking spaces may be used only at certain hours of the day, or certain days of the week, for a certain maximum duration or a combination of all. In such an arrangement, when parking at designated approved times, no cost will generally be involved with the use of the parking spaces. Alternatively, parking may be open to certain vehicles at certain allowable times, or at all times where the vehicle can be shown to possess a parking permit or other similar notification mechanism. The parking permit is issued by the appropriate authority and allows for parking at times specified by the authority.

Figure 2:
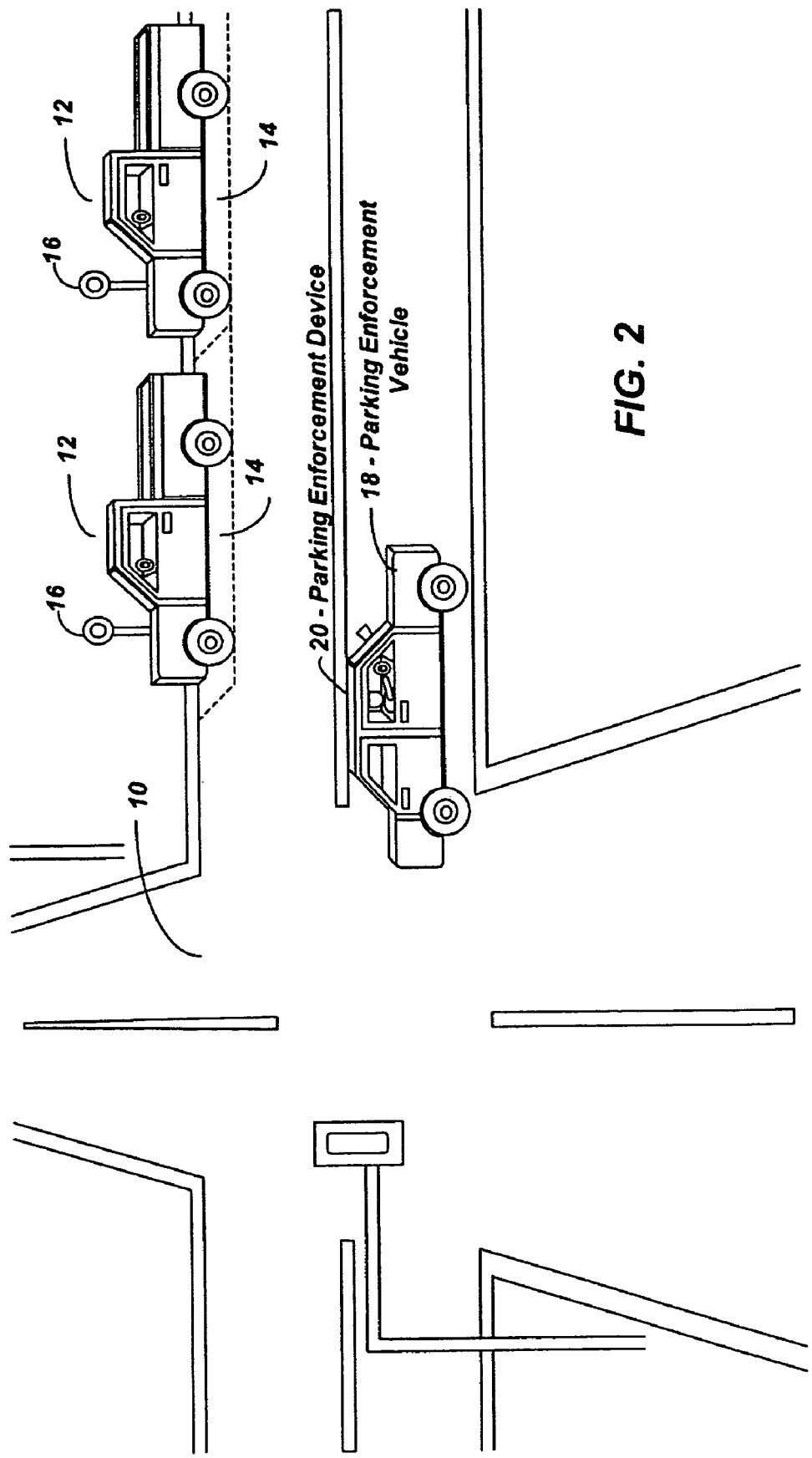
FIG. 2 is a block diagram illustrating a parking enforcement vehicle upon a roadway.

Reference is now made to FIG. 2, where the roadway 10 is shown with a parking enforcement vehicle 18. The parking enforcement vehicle 18 is driven by a parking enforcement officer. The parking enforcement vehicle 18 is equipped with an infraction detection device 20. The infraction detection device 20 is accessible to the parking enforcement officer. The device 20 determines whether parking infractions have occurred, informs the enforcement officer when an infraction has been detected, records information relating to the infraction, issues infraction notices, and transmits infraction information to a database for processing and storage, as is further described.

Figure 3:
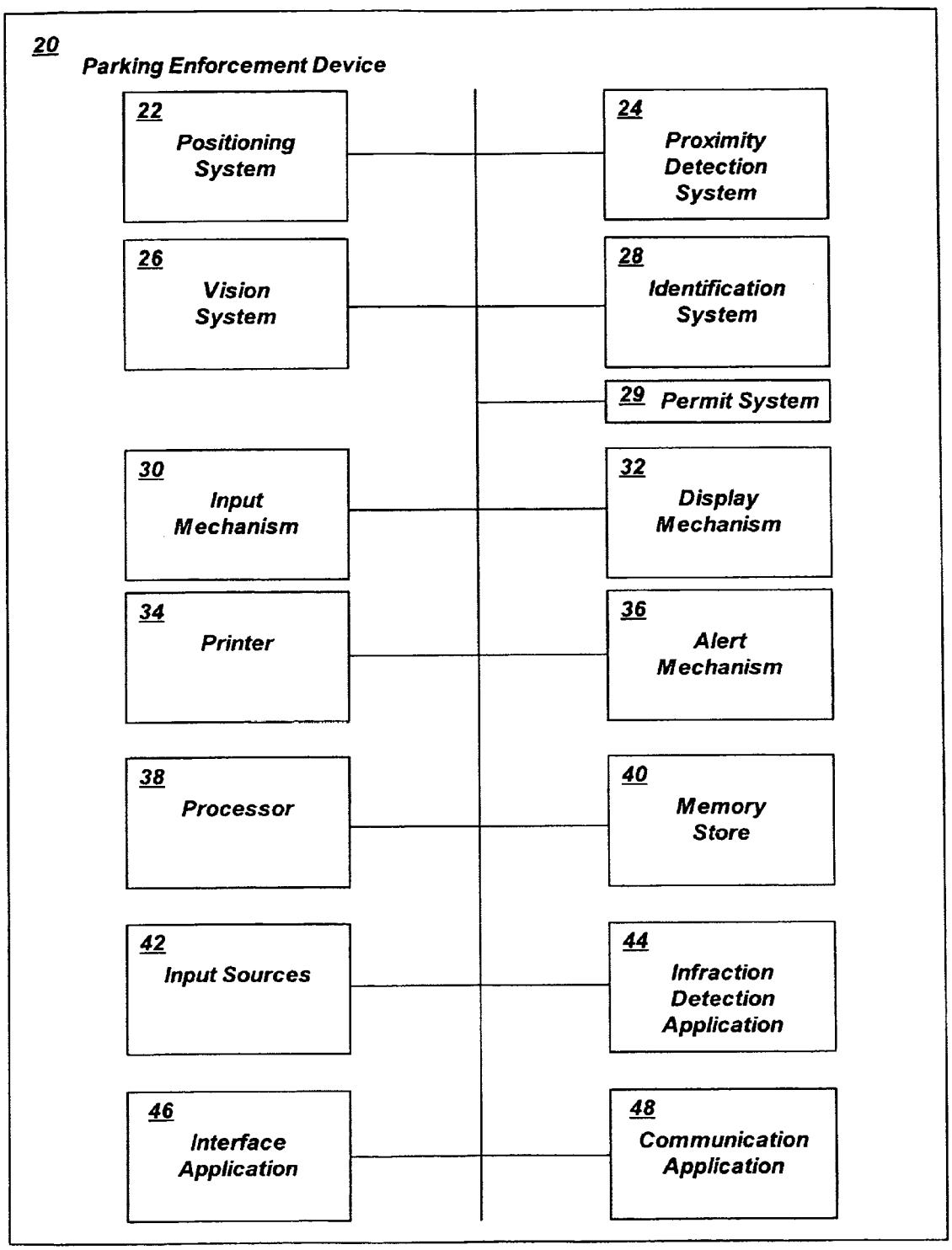
FIG. 3 is a block diagram of the components of an exemplary embodiment of an infraction detection device.

Reference is now made to FIG. 3, where the constituent components of the infraction detection device 20 are shown. The infraction detection device 20 in one exemplary embodiment is comprised of, or connected to, a positioning system 22, a proximity detection system 24, a vision system 26, an identification system 28, an electronic permit system 29, an input mechanism 30, a display mechanism 32, a printer 34, an alert mechanism 36, a processor 38, a memory store 40, one or more input sources 42, an infraction detection application 44, an interface application 46 and a communication application 48.

The positioning system 22 provides to the detection device 20 coordinates of where the detection device 20 is located at any moment in time. In one exemplary embodiment of the invention, the positioning system 22 is based on a Satellite Based Positioning System, an example of which is GPS (global positioning system) technology and is comprised of a GPS receiver as is illustrated in further detail in FIG. 6. In alternative embodiments, other technologies may be used to provide positional information, and they include, but are not limited to, having RFID devices located on each parking block, and triangulation technologies that make use of transmitter towers. The proximity detection system 24 is used to signal to the detection device 20 the distance to the nearest object. In an exemplary embodiment of the invention, an infrared measurement laser with a sampling frequency of 400 Hz is used to implement the proximity detection system. The proximity detector 24 is connected to the detection device 20 and its components through a serial or parallel electronic interface. The proximity detection system outputs to the device 20 the distance to the nearest object. In alternative embodiments, two or more detectors may be used, so as to be located on both the passenger side and driver side, to be able to detect vehicles that are parked on both sides of the roadway 10. Also, in alternative embodiments of the invention, the proximity detector may be any one of an acoustic, capacitive or photoelectric/laser proximity detector or other measurement device.

The vision system 26 is used to capture images of vehicles 12 that are parked on a roadway 10. The vision system 26 may be comprised of one or more cameras that capture digital images of vehicles or parts of vehicles and the size measuring capability of the proximity laser that are then transmitted to the infraction detection device 20. In an exemplary embodiment of the invention, the vision system 26, and more specifically the cameras that comprise the vision system 26 are mounted on the parking enforcement vehicle 18, and provide the images that are captured to the detection device 20 by wired or wireless means. In an exemplary embodiment of the invention, the vision system 26 comprises a first camera and a second camera (not shown). The first camera is used to detect the profile and colour of the vehicle. The first camera captures the view of the vehicle that is parallel to the side of the parking enforcement vehicle. When vehicles are parked parallel to the route of travel of the enforcement vehicle, in an exemplary embodiment of the invention, the first camera will therefore capture an image of the vehicle that will include items found approximately 1 meter to the front and rear of the vehicle. As a result, the surroundings associated with the vehicle are recorded, and may be used to determine when in fact, a vehicle has been moved from its location. The second camera is used to record the license plate of the vehicle, and provides supplementary lighting for illuminating the vehicle in poor lighting conditions. Additionally, the vision system 26 in an exemplary embodiment of the invention, comprises laser measurement devices (not shown) which are used in the proxomity detection system to determine the length of the vehicle. In an exemplary embodiment of the invention, the cameras are high performance digital imaging CCD devices. The measurement device of the vision system in an exemplary embodiment is an infrared measurement laser. The infrared measurement laser, in an exemplary embodiment is angled 21 degrees from the horizontal, and measures the length of vehicles by continuously measuring the distance to the ground The identification system 28 is used to determine based on the output of the proximity detection system 24 and the vision system 26, whether the distance to the objects determined by the proximity detection system 24, and the objects captured by the vision system 26 are representative of vehicles. The identification system 28 in an exemplary embodiment of the invention is a software application that takes as input the distance to the nearest object, and the length of the nearest object as determined by the lasers of the vision system 26. The operation of the identification system 28 is further explained with reference to FIG. 14.

The electronic permit system 29 is used to administer parking regulations where electronic permits have been issued to the motorists, which allow the vehicle to be parked in specific areas. The use of the electronic permit system 29 is further explained below with reference to FIG. 14 and FIG. 15.

The input mechanism 30 allows the parking enforcement officer to provide input to the detection device 20. The enforcement officer is required to interact with the device 20 in order to control the operation of the device 20. The input mechanism 30 may be of various types, including but not limited to a keyboard, a mouse, joystick, a pointer device, a microphone and a touch screen. In an exemplary embodiment of the invention, a plurality of input devices are associated with the detection device, namely a standard QWERTY keyboard, along with a touch screen that is part of the display mechanism 32 of the device 20. The display mechanism 32 allows for the detection device 20 to display to the enforcement officer information pertaining to the detection of parking infractions. The display mechanism 32 will generally be a built in screen capable of operating as a touch screen that is part of the detection device 20.

The printer 34 may be built in to the detection device 20, or connected via wired or wireless means. The printer 34 is used to print out parking infraction notices (tickets), which may then be placed upon the offending vehicle. The alert mechanism 36 signals to the parking enforcement officer that an infraction has been detected by the detection device 20. The alert mechanism in an exemplary embodiment of the invention produces an audible alarm signal, which is used to notify the enforcement officer that an infraction has been detected. The processor 38 is the central processing unit of the detection device that is used to control the operation of the detection device 20. The memory store 40 is the memory module associated with the detection device 20, the constituent components of which are described in further detail in FIG. 4.

The detection device 20 may have associated with it one or more input sources 42. The input sources provide to the detection device 20 additional sources of data that may be used to determine the position of the parking enforcement vehicle 18, which may include but are not limited to the odometer of the enforcement vehicle 18, the speedometer of the enforcement vehicle 18, or any other accurate velocity measurement devices such as a microwave or Doppler laser device, and an accurate compass (typically hall effect compasses), and any other on board information sources associated with the enforcement vehicle 18.

The infraction detection application 44 is a software application that is used to determine whether a parking infraction has been detected when the location and images of specific vehicles are captured as the enforcement vehicle 18 navigates a roadway. The interface application 46 is a software application that is used to sync the databases associated with the detection devices which will be described in detail below, with databases that are associated with a back office that is used to centrally store all information relating to parking infractions that have been detected by the various enforcement vehicles 18. The communication application 48 allows for a communication link between the detection device 20 and the back office.

Figure 4:
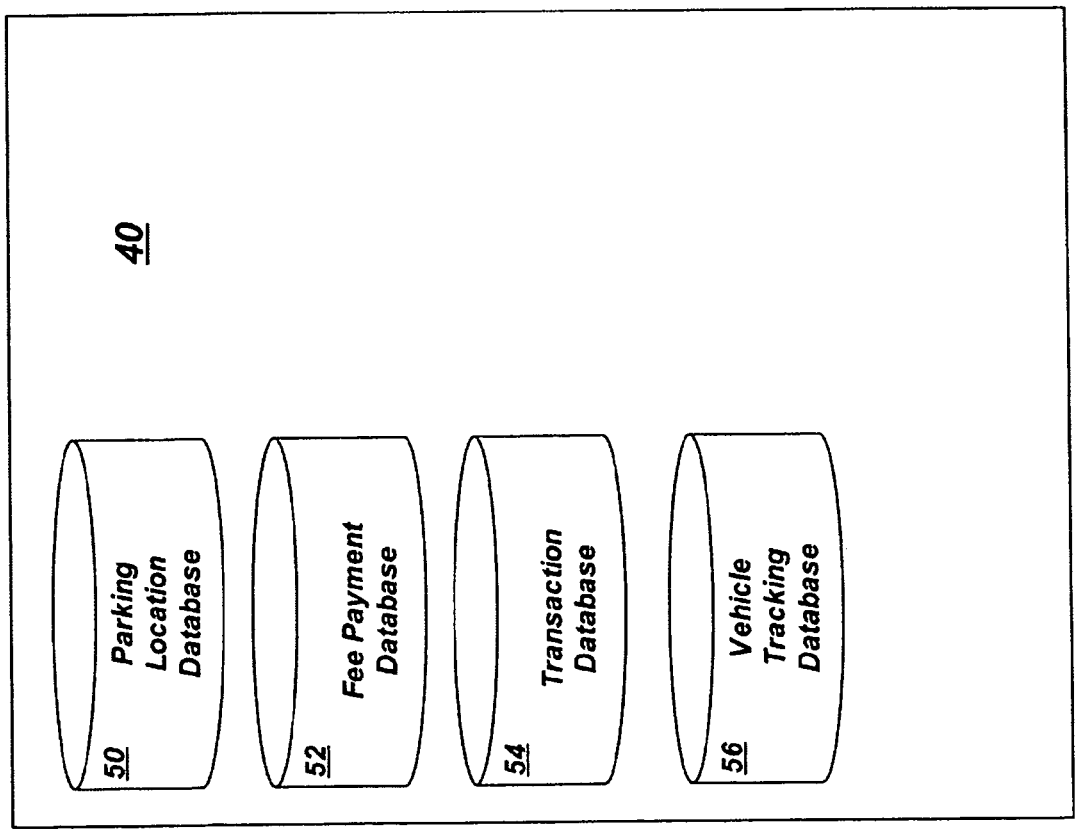
FIG. 4 is a block diagram of the components stored in the memory store associated with the infraction detection device.

Reference is now made to FIG. 4, where in one exemplary embodiment of the invention, the constituent components of the memory store 40 associated with the detection device 20 are shown. A parking location database 50, a fee payment database 52, a transaction database 54, and a vehicle tracking database 56 are all resident upon the memory store 40 associated with the detection device 20. The parking location database 50 contains for a specific area information pertaining to the parking regulations that are in force, and where parking is and is not allowed. The parking location database is described in further detail below with reference to FIG. 8.

The fee payment database 52 is used to keep track of the validity of parking permits and any fees that have been paid for parking permits. As described below, parking permits may be electronic permits, based on transponder and/or RFID technology. The electronic permits are mounted inside of a vehicle and will signify to the infraction detection device 20 that the vehicle has a valid parking permit which allows the vehicle to be parked in a specific locale at a specific time. The operation of the electronic permits is described further below in FIG. 7. The transaction database 54 is described in further detail in FIG. 11, and is used to keep track of instances when the infraction detection device 20 has detected the use of any electronic permits when the parking enforcement vehicle 18 has been on patrol. The vehicle tracking database 56 is used to record information when the parking enforcement vehicle is on patrol pertaining to the observation of any parked vehicles. The vehicle tracking 56 database is described in further detail in FIG. 12.

Figure 5:
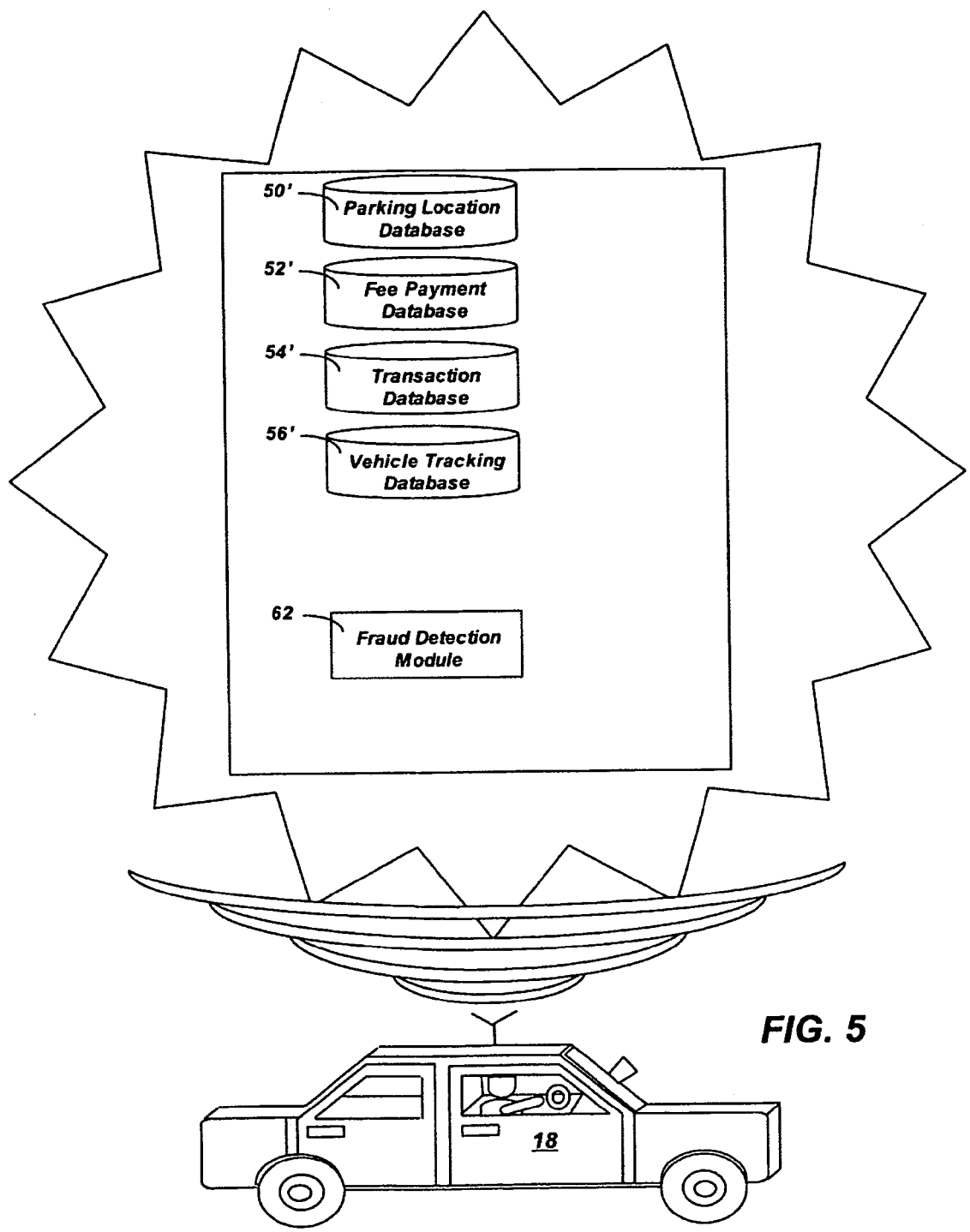
FIG. 5 is a block diagram illustrating the components of the backend office.

Reference is now made to FIG. 5, where the parking enforcement vehicle 18, and its interaction with a parking enforcement back end office 60 is shown. The backend office 60 in one exemplary embodiment of the invention has securely stored the databases that have been downloaded prior to the detection device 20 prior to each patrol of the enforcement vehicle 18. The backend office 60 stores a parking location database 50', a fee payment database 52' a transaction database 54', and a vehicle tracking database 56'. The respective databases stored at the backend office with the exception of the vehicle tracking database 56, in one exemplary embodiment of the invention are downloaded by the infraction detection device 20 before the start of a parking enforcement vehicle's route. Therefore, before the start of the route, when the databases have been downloaded, the databases that are stored upon the memory store 40 associated with the detection device 20 are identical to those stored at the backend office 60. The information stored upon the backend office 60 may be downloaded to the infraction detection device 20 through various means, including, wired, USB removable memory stick, or wireless means such as an Internet connection, or other secured network connection. In an alternative embodiment of the invention, it is not necessary that the detection device 20 download the databases stored upon the backend office 60 prior to the commencement of a patrol, as the detection device can access the contents of such databases and write to such databases in real time upon the backend office 60. The backend office 60 also comprises in addition to the respective databases that have been mentioned above, a fraud detection module 62. The fraud detection module 62, the operation of which is described in further detail below, is used to determine whether there is any fraud associated with the use of electronic permits (i.e. whether the same electronic permit has been used in two separate locations, where it would not be possible to do so owing to time and distance considerations).

In an exemplary embodiment of the invention as illustrated in FIG. 5, the infraction detection device 20 communicates with the backend office 60 through a wireless network connection. The infraction detection device 20 and the backend office 60 are able to communicate in real time. In alternative embodiments, where the infraction detection device 20 accesses the backend office 60 in real time when attempting to determine whether parking infractions have taken place, the backend server 60 based on the information provided to it by the infraction detection device (from the vision system and proximity detection system), determines whether a parking infraction has taken place. Therefore, the back end office may also have stored upon it an infraction detection application.

Figure 6:
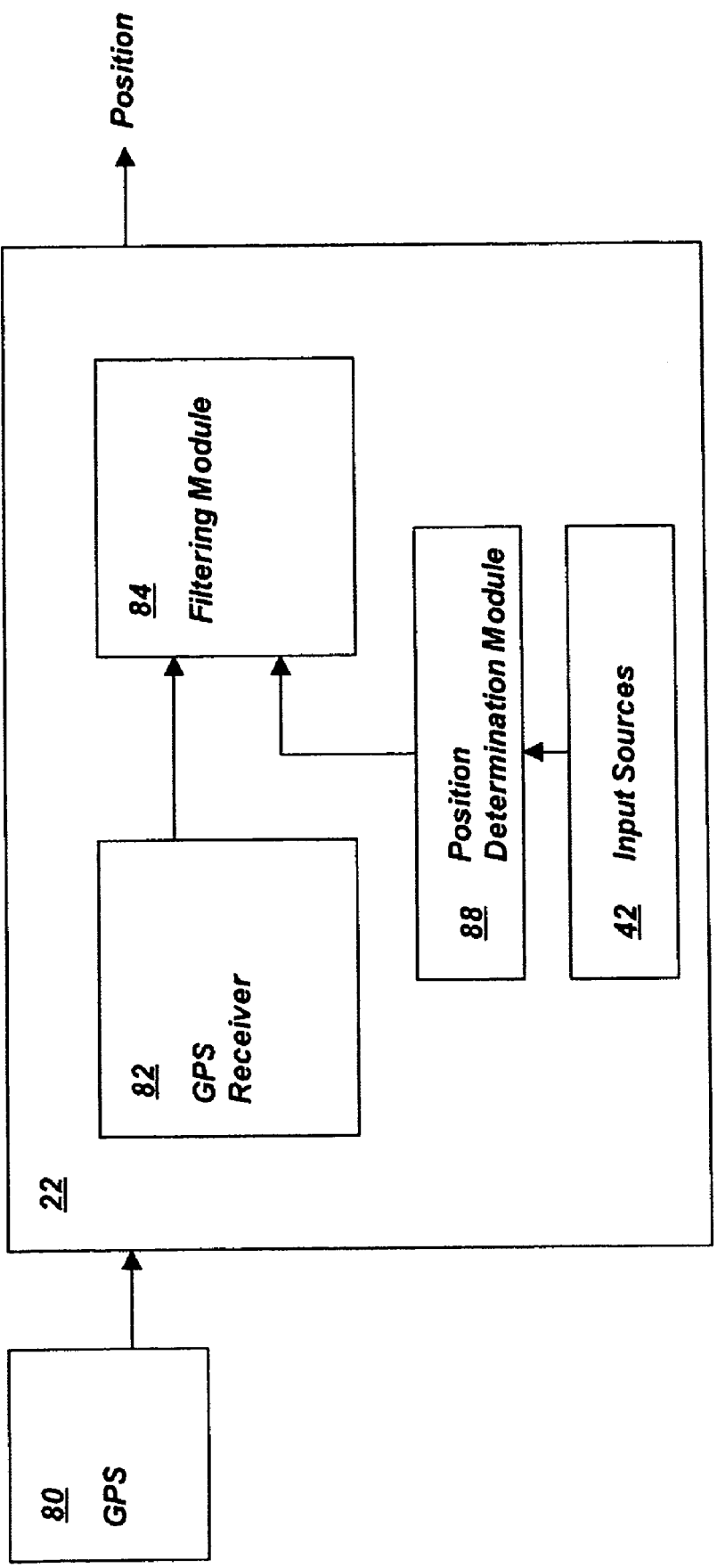
FIG. 6 is a block diagram illustrating the components of an exemplary embodiment of the positioning system.

Reference is now made to FIG. 6, where the positioning system 22 is described in further detail. In an exemplary embodiment of the invention, the positioning system 22 is based on GPS technology. The GPS data serves as the primary source of positioning data. The positioning system 22 relies on positional information that is provided to it by GPS satellites 80. The GPS satellite 80 data is provided to components of the positioning system 22, which in this exemplary embodiment of the invention is a GPS receiver 82. The GPS receiver 82 provides the positional information it receives to a filtering module 84, which applies a kalman filtering operation to output the final positional information. Alternatively, the filtering module 84 also receives input from a position determination module 88 along with input from the GPS receiver to determine a final position. The position determination module 88 receives input from one or more of the input sources 42. The position determination module 88 may receive one or more inputs from the odometer, speedometer, other velocity measuring devices such as microwaves or Doppler radar, or external sources such as compasses or gyroscopes. The input from the position determination module 88 is particularly advantageous where the GPS signal may be degraded, as is sometimes the case in urban environments, where the GPS signal may be affected. Where the GPS signal is degraded, the data provided by the input sources is used to determine the position, employing a method that may be referred to as dead reckoning. The distance and time traveled since the last accurate GPS position was provided are measured. The distance is taken as a vector (by employing a compass), and therefore an accurate speed and distance traveled measurement is calculated. A vector route originating from the location last provided by the GPS signal is then plotted, and a new location is therefore determined based on input provided by the input sources. The input sources 42 provide data to the positional determination module 88 through use of a vehicle's on board diagnostic port. The positioning system 22 outputs its coordinates in an industry standard format such as NMEA0183.

Figure 7:
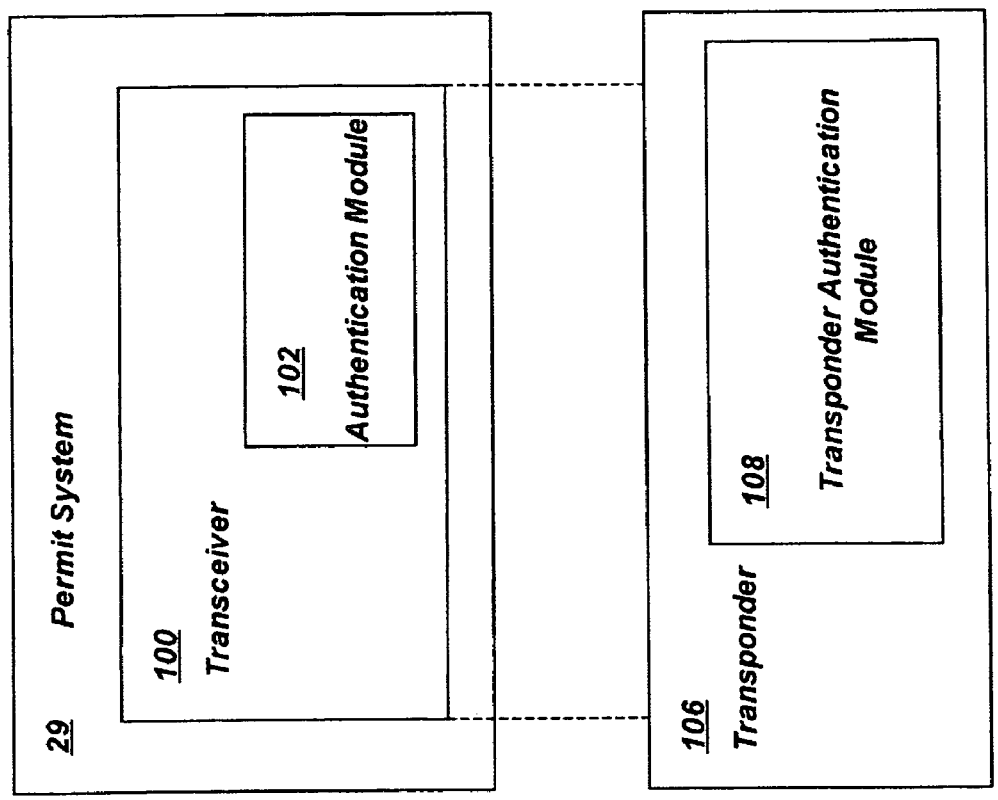
FIG. 7 is a block diagram of the components of the electronic permit system.

Reference is now made to FIG. 7, where the electronic permit system 29 is illustrated in further detail. The parking enforcement vehicle 18 will have associated with it a transceiver 100. The transceiver in one exemplary embodiment is an RFID reader. All vehicles that have associated with them electronic permits will be assigned a transponder 106. In one exemplary embodiment, the transponder 106 is implemented as an RFID tag. The transceiver 100 and the transponder 106 are able to communicate through a radio frequency link. Each transponder 106 has associated with it, a unique identification code, which is capable of being read by the transceiver 100. Both the transceiver 100 and the transponder 106 may have associated with them optional authentication modules. The transceiver 100 may have associated with it an authentication module 102, and the transponder 106 may have associated with it a transponder authentication module 108. The authentication modules of both the transceiver 100 and the transponder 106 in an exemplary embodiment of the invention are implemented as tamper resistant cryptographic microchips that are used to store encryption keys and implement a challenge response scheme. The transceiver is connected to other components that are associated with the infraction detection device 20 through standard interface connections, which may include wired or wireless means. The challenge response scheme is implemented in order to ensure that that the transponder 106 is an authorized transponder, and has not been cloned, so as to eliminate the possibility that fraudulent parking permits are being used.

Reference is now made to FIG. 8, where the fields of the parking locations database 50 are illustrated. The parking locations database 50 is used by the infraction detection device 20 when determining whether parking is permitted in specific areas, and if it is, whether there are any restrictions associated with the parking. The parking location database 50 in an exemplary embodiment of the invention is comprised of the following fields, a street name field 120, a street co-ordinates field 122, a locations of parking areas field 124, a locations of non parking areas field 126, and a parking restrictions field 128. In one exemplary embodiment of the invention, a parking locations database is created and includes all the streets that are on a parking enforcement officer's route. The street name field 120 is used to store the street name for all the roadways that are on a particular route. The street co-ordinate field stores the GPS coordinates for the beginning, duration and end of the street. The locations of parking areas field 124 provides one or more co-ordinate sets indicating a beginning co-ordinate, duration and an end co-ordinate where parking may be allowed. This co-ordinate set will specify areas on the route where parking may be allowed at one time or another during the week, month or year. The locations of non-parking areas field 126 provides one or more co-ordinate sets, between which parking is never allowed. Areas where parking is never allowed, may include, but are not limited to, fire routes, areas in front of fire hydrants, areas in front of driveways, and other such areas. The parking restrictions field 128 for each co-ordinate set contained in the locations of parking areas field 124 will specify all the restrictions that may be associated with parking in such areas. For example, the parking restrictions may state that parking is only allowed at certain times of the day, week, month, or year. Also, the parking restrictions field may state that parking is only permitted through for limited durations, or that parking may be only be permitted through the use of an electronic permit. The parking locations database 50 is queried by the infraction detection device 20 when the device 20 is attempting to determine whether parking infractions have occurred.

Figure 9:
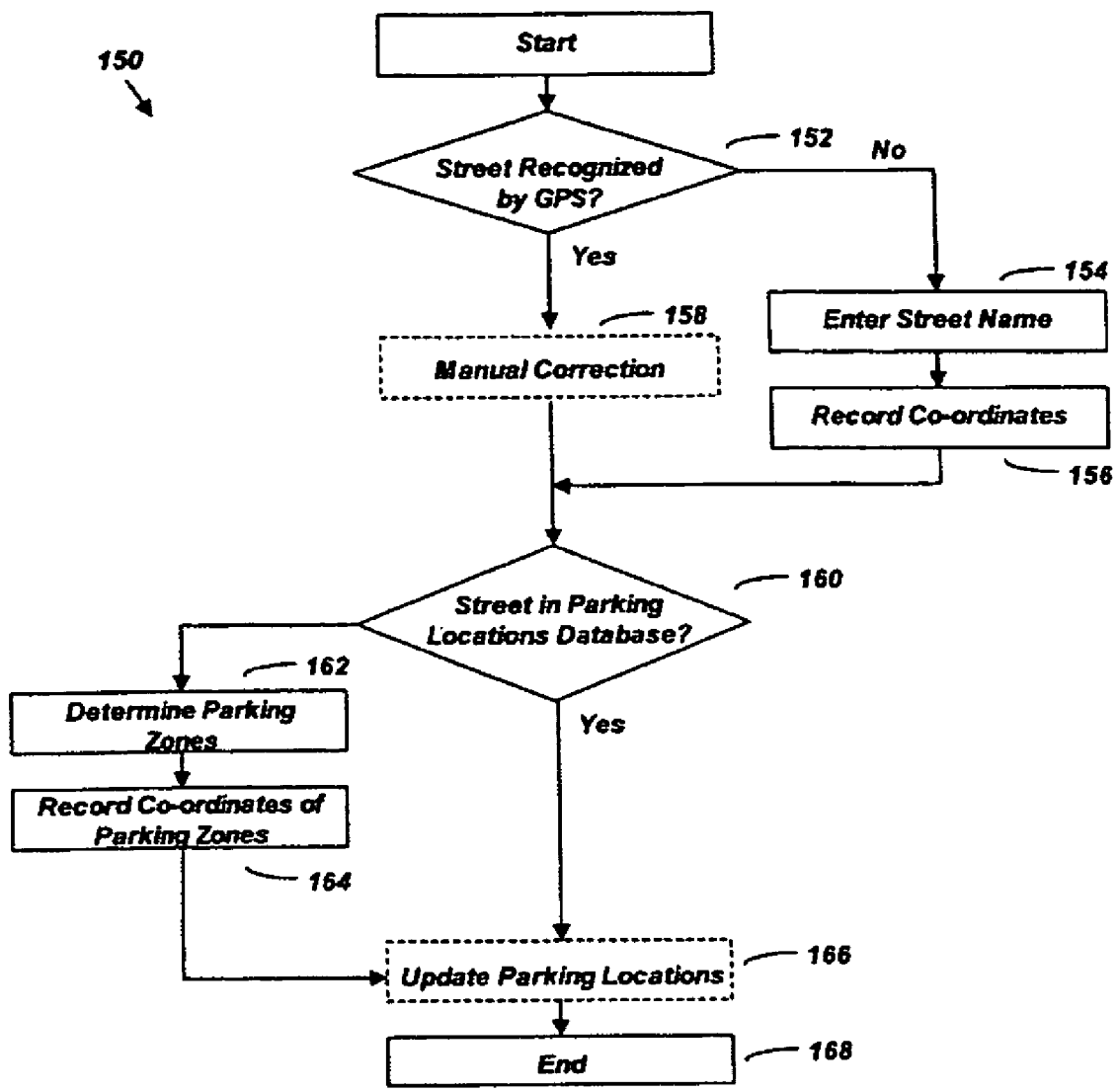
FIG. 9 is a flowchart illustrating the steps of a street mapping method.

Reference is now made to FIG. 9, where the steps of the parking mapping method 150 are shown. The parking mapping method 150 is undertaken for each roadway that is to be part of the parking locations database 50, and therefore for which the parking enforcement vehicle is used to enforce the respective parking regulations associated with such a roadway. Parking location mapping method 150 begins at step 102 where at the beginning of a particular roadway that is to be included in the parking locations database 120 a check is performed of the positioning system 22, and more specifically of the GPS receiver 82 to determine whether the roadway is recognized by the GPS receiver 82. If the roadway is not recognized by the GPS receiver method 150 then proceeds to step 154, where the parking enforcement officer or other authorized individual that is conducting method 150, manually enters the street name. Method 150 then proceeds to step 156 where the co-ordinates that mark the beginning of the roadway are taken from the GPS receiver and recorded in the database 120. If at step 152, it is determined that the street is recognized by the GPS receiver, method 150 then proceeds to optional step 158. At optional step 158, the enforcement officer or other authorized individual, may manually correct if required, the name of the street that is returned by the GPS receiver.

Upon the conclusion of step 156, and optional step 158, method 150 proceeds to step 160. At step 160, a check is performed to determine whether the current street is in the parking locations database 160. If the street is found within the parking locations database 120, method 150 proceeds to optional step 166. Step 166 is an optional step wherein the enforcement officer or other authorized individual may update any of the information in the database, as to the allowable parking areas, or restrictions associated with any of the parking areas. If the street is not found within the parking locations database 120 at step 160, method 150 proceeds to step 162. At step 162, the enforcement officer or other operator will determine the beginning and end of each allowable parking zone on the roadway, and record the beginning and end co-ordinates as taken from the GPS receiver for each zone. The determination of the allowable parking zones at step 162 is done manually as the enforcement officer or other authorized individual observes all parking ordinances that are posted, and observes areas where parking is not allowed. Steps 162 and 164 are repeated for all of the allowable parking zones that are found on the roadway that is being mapped. Steps 162 and 164 conclude respectively, when all the areas upon the roadway where parking is allowed have been mapped. Any parking restrictions that have put in place with respect to time and or necessity of an electronic permit, are entered into parking restrictions field 128 for each street along with the co-ordinates associated with such restrictions.

Method 150 terminates at step 168 where the end co-ordinates of the respective roadway that was being mapped are entered into the parking locations database 120. As the parking locations database 120 as updated by method 150 may have been resident upon the memory store 40 associated with the infraction device 20, the updated database 120 may then be uploaded to the backend server 60. Method 150 is undertaken for each roadway that is to be part of the parking locations database 50.

In alternative embodiments, other variant methods may be employed to map the parking locations found within a particular route. One such method involves the use of a map of a route, including all the roadways that are part of the route, displayed on the screen, where a user specifies on the screen by highlighting the areas where parking is allowed, and specifying any and all restrictions that may be associated with parking upon those particular roadways. The user is also able to specify street names, street co-ordinates, or provide any other suitable information.

Reference is now made to FIG. 10, where the fields of the fee payment database 52 are shown. The fee payment database 52 is used to administer the electronic parking permit system. Specifically, as the electronic permits in an exemplary embodiment are transponder based, it is required that the transponders 106 that have been issued to motorists are kept track of in order to determine whether they are still valid. The fee payment database 52 in one exemplary embodiment is comprised of the following fields, the name/details field 200, the unique id field 202, the transponder ID field 204, the payment amount field 206 and the status field 208. The name/details field 200 is used to store the name and or details of the individual or organization to whom the transponder 106 has been issued. The unique ID field 202 stores the unique identifier that is used by the transceiver 102 to determine the identity of the transponder 106. The transponder ID field 204 may store any other identifier that is associated with the transponder (i.e. the serial number associated with the transponder). The payment field 206 is used to record any instances of payment received by the appropriate authority for use of the transponder 106. This therefore allows for a determination as to whether the transponder is valid, with respect to any fees that have to be paid for its use. The status field 208 contains an indication as to whether the status of the transponder is valid, or whether the transponder is suspected of having been cloned, and therefore whether it may is being used fraudulently. As owners of electronic permits may pay fees associated with use of their transponder at any time, a variety of methods are allowed by which fees may be paid for use of the electronic permit. Such methods include, but are not limited to, payments through the Internet, a bank, on the phone, mail, or in person. Regardless of the method used to pay fees associated with the electronic permit, it is important that the detection device 20 has up to date information with respect to the fee payment database 52. Therefore, whenever a payment is received and recorded in the fee payment database 52 upon the backend office 60, an update is sent to the detection device 20 in real time. This ensures that the detection device 20 has the most accurate information, and does not incorrectly allow for an infraction to be issued for use of an electronic permit that it deems to be invalid.

Reference is now made to FIG. 11, where the fields of the transaction database 54 are illustrated in greater detail. The transaction database 54 is used to record the instances where a transponder has been determined to be present in a vehicle by the transceiver 102 associated with the infraction detection device 100. By recording the instances where a transponder 106 is present, instances of fraud may be determined, by determining whether a transponder has been cloned. Fraud may be perpetrated through various means, including hacking of the transponder, or by cloning the device. The transaction database 54 in one exemplary embodiment is comprised of a transponder ID field 220, a location field 222, a time field 224 and a status field 226. The transaction database is populated with a new entry at every instance when a transponder 106 is detected by the transceiver 102. The transponder ID field 220 stores one or more of the identifiers associated with the transponder 106. The location field 222 stores the co-ordinates of the vehicle in which the transponder was found. The location field 222 receives its input from the positioning system 22, and more specifically the GPS receiver 82. The time field 224 records the time at which the transponder was detected.

Reference is now made to FIG. 12, where the fields of the vehicle tracking database 56 are shown. The vehicle tracking database 56 stores images of all the vehicles that the infraction detection device 20, and more specifically the vision system 26 records while on patrol. The location field 252 provides the GPS co-ordinates of where the vehicle was observed parked. The location field 252 stores the address co-ordinates associated with the closest address that may be associated with the vehicle 12 when parked. In an exemplary embodiment of the invention, two images are taken of the vehicle, one image recording the profile of the entire vehicle, and one image recording the license plate. The $T_1$ field 254 records the time at which the vehicle was first recorded by the infraction detection device. The $T_1$ identifiers field 256, stores the images taken of the vehicle 12, and identifiers that may be used to identify the vehicle, based on the images. The identifiers may include, but are not limited to the colour of the vehicle, the length of the vehicle, the length of the cab, and contour of the cab, the offset of the cab, the offset of the trunk and the hood lengths, along with dimensions of the headlights. The countour (shape) of the vehicle, and of various objects found on the vehicle is determined by the sampling of the laser associated with the vision system 26 and proximity system 24. As an example, as the enforcement vehicle 18 passes a particular vehicle 12, the laser may have taken over 200 samples, and therefore an accurate shape profile may be determined. The offset of the cab is determined by the laser measurements which determines the offset, as the shape of the vehicle changes between the rear bumper and the start of the cab offset. The laser measurements as they taken regularly, are able to determining the profile of a vehicle, and accurately determine contours, and offsets associated with the vehicle. For vehicles that are parked such that they are perpendicular to the curb, other measurements may be used, including the shape of the headlights or tail lights. If the same vehicle is found parked in the same location at another instance of time, the $T_2$ field 258 is used to record the time at which the vehicle was observed parked in the same location. The $T_2$ identifiers field 260 are used to store the identifiers that are associated with the images taken of the vehicle at the second instance it was recorded as being parked on the roadway. The time duration field 262 will compute the time that has elapsed between the first observation of the vehicle and the second observation, where applicable. The transponder field 264 is used to indicate whether a transponder 106 was detected by the transceiver 102 when the vehicle was detected by the infraction detection device 20. The vehicle tracking database 56 and its use in determining parking infractions is further illustrated with references to FIGS. 15 and 16 respectively. The vehicle tracking database 56 is used to determine the length of time a vehicle has been parked on a particular roadway, in order to determine, as is described below, whether the appropriate allowed time durations for parking have been exceeded. If these allowed time durations have been exceeded, a parking infraction will have been detected, and a parking infraction notice will be issued. Upon an image of the vehicle being taken, the infraction detection application 44 receives the image as an input, and analyzes the digital image to determine the colour, length, contours and object dimensions (i.e. hood sizes, head light dimensions) and records them in the appropriate identifiers field of the vehicle tracking database 56. The colour of the vehicle is determined through sampling the images taken of the vehicle, at a finite number of points. In an exemplary embodiment of the invention 20 points are taken from the image, and a colour value is determined. The shape of the vehicle is determined through edge detection and polygon analysis. The length of the vehicle is determined as previous stated, based on laser measurements.

Figure 13:
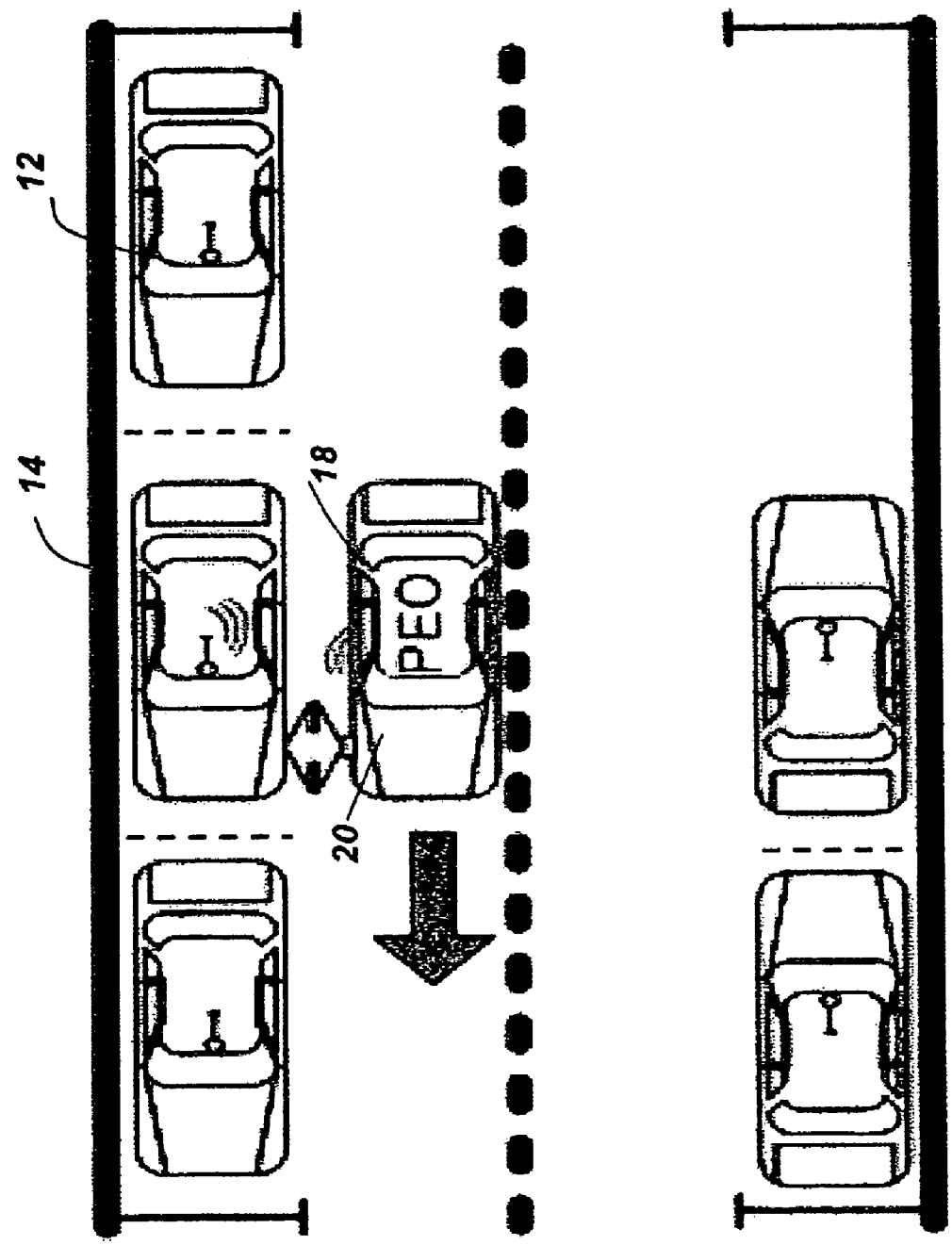
FIG. 13 is a block diagram illustrating a parking enforcement vehicle on a patrol.

The operation of the parking enforcement vehicle 18, and the infraction detection device 20 while on patrol to detect parking infractions is now explained in further detail with reference to FIG. 13-FIG. 19. Reference is now made to FIG. 13 where an illustration of a parking enforcement vehicle 18 while on a route to detect parking infractions is shown. The enforcement vehicle 18 will have on board the detection device 20. The enforcement vehicle 18 has the cameras that comprise the vision system 26 of the detection device 20 mounted on the outside of the enforcement vehicle 18. The enforcement vehicle 18 also has mounted on it the proximity detection system 24 that is used to detect the general proximity of objects to the enforcement vehicle 18 and accurately measure the vehicle length In alternative embodiments, the enforcement vehicle 18 as illustrated in FIG. 13 may be outfitted with a proximity detection system 24 located on either side of the enforcement vehicle 18, and with a vision system 26 that is able to capture images of vehicles parked on both sides of the street, as one would find on a one way street. The outfitting of the enforcement vehicle with proximity detection systems 24 on either side of the enforcement vehicle 18 and vision systems 26 able to capture images from either side of the enforcement vehicle 18, allow both sides of a roadway to be monitored for purposes of detecting parking infractions.

Before the start of each patrol of the enforcement vehicle 18, the infraction detection device 20 in an exemplary embodiment of the invention downloads copies of the databases, with the exception of the vehicle tracking database 56, from the backend office 60. The vehicle tracking database 56 is created as a result of the patrol of the enforcement vehicle 18, and therefore is uploaded for storage to the backend office 60 upon the termination of patrol. In alternative embodiments, the infraction detection device 20 may query databases stored at the backend office 20 in real-time to determine whether parking infractions have taken place.

In FIG. 13, the enforcement vehicle is shown traveling parallel to the orientation of the parking of the vehicles. The infraction detection device 20 of the present invention is able to determine parking infractions where vehicles are parked in any orientation. Specifically, the vehicles may be parked so that they are perpendicular to the curb of the roadway, or at any other angle. In an exemplary embodiment of the invention, the enforcement vehicle is able to travel while on patrol detecting infractions at speeds exceeding 40 Km/H.

Figure 14:
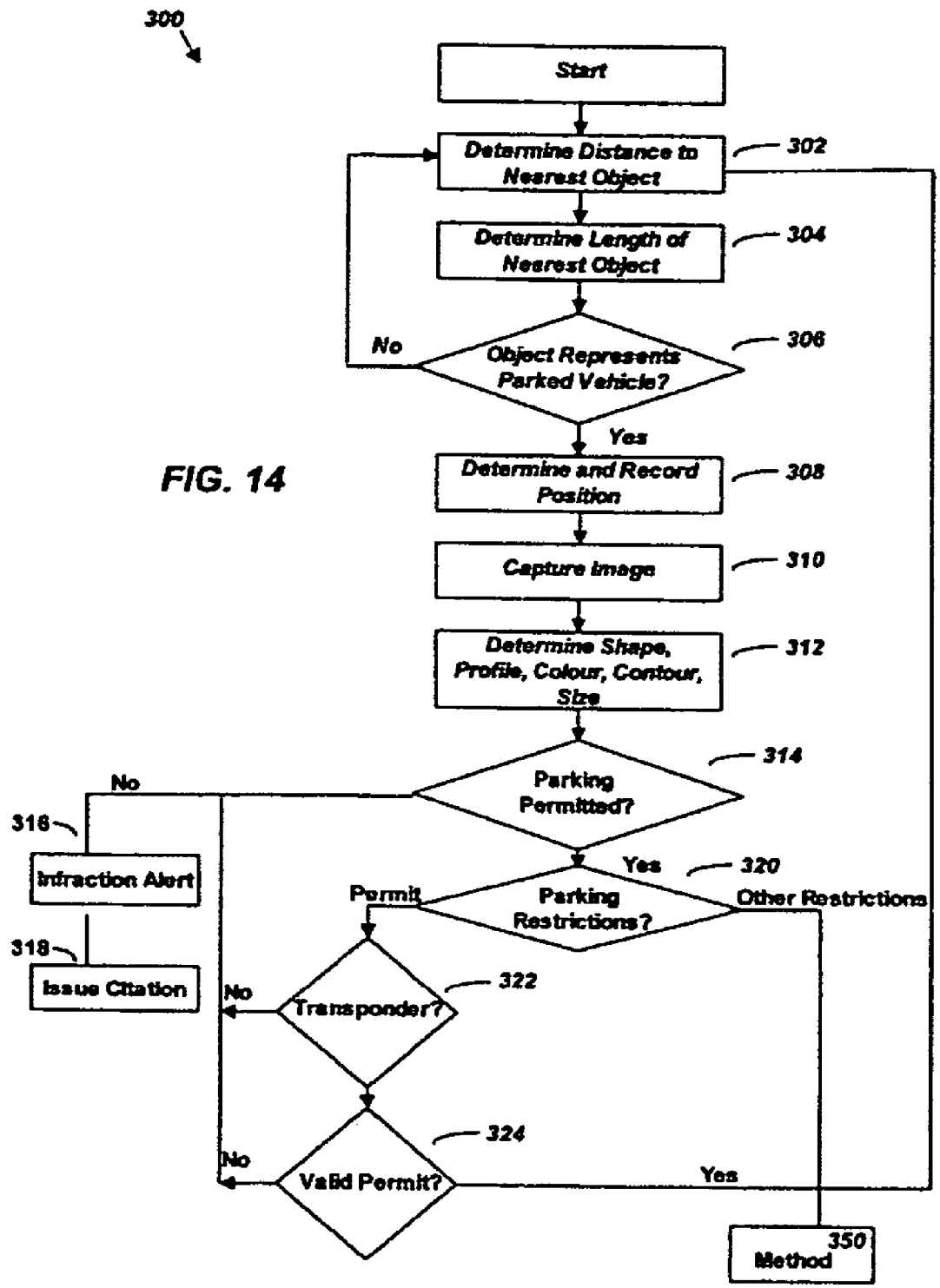
FIG. 14 is a flowchart illustrating the steps of a parking monitoring method.

Reference is now made to FIG. 14, where the steps of a parking monitoring method 300 are shown. The parking monitoring method 300 is initiated when the parking enforcement vehicle 18 begins a patrol. The monitoring method 300 determines whether a vehicle is parked on a roadway, records the images and extracts the identifiers that are used to uniquely identify the vehicles and then queries the parking location database to determine if parking is allowed in the respective area in which the vehicle is found. If parking is allowed, the restrictions associated with parking of vehicles in those areas are also determined. Method 300 begins at step 302, where the proximity detection system 22 determines the distance to the nearest stationary object. The proximity detection system 22 provides to the detection device 20 the distance it has measured to the nearest object. Method 300 then proceeds to step 304 where the length of the nearest object is determined.

At step 304 the length of the vehicle is determined by the vision system 26. Method 300 then proceeds to step 306, where a check is performed to determine whether the object that has been detected by both the proximity detection system 22 and the vision system 26 may be classified represents a parked vehicle. The identification system 28 of the infraction detection device 20, receives the respective inputs from the proximity detection system 22 and the vision system 26 and subsequently processes the input to determine whether the object is a parked vehicle. If at step 306 it is determined that the object does not represent a parked vehicle method 300 returns to step 302, where the proximity detector 24 determines the distance to the next nearest object, as the enforcement vehicle 20 has been moving throughout this process, the next object that is detected is different to the previous object that was detected. If at step 306, it is determined that the object detected by the components of the detection device 20 is a parked vehicle, method 300 proceeds to step 308. At step 308, the positioning system 22, and more specifically the GPS receiver 80 is queried to determine the current position of the infraction detection device 20, and also therefore, the parked vehicle. The positional information returned by the positioning system 22 is then recorded in the vehicle tracking database 56. Method 300 then proceeds to step 310, where the vision system 26, and more specifically the digital cameras that comprise the vision system record a plurality of images of the vehicle 12. Based on the output of step 306, a trigger is sent to the cameras associated with the vision system 22 to capture images of the vehicle. In an exemplary embodiment of the invention, an image of the entire vehicle is taken, along with an image of the license plate of the vehicle. Depending on the speed of the enforcement vehicle 18, the images that are taken are timed so as to be synchronized to an angle that allows for an image of the entire vehicle to be captured, as well as an image of the license plate. Upon the vision system 22 capturing images of the vehicle, method 300 proceeds to step 312, where the infraction detection application 44 processes the images taken by the digital cameras and the length determined by the laser to determine and record the identifiers associated with the vehicle. As mentioned above, identifiers may include, but are not limited to the colour, shape, profile, size, contour, headlight features, and hood features. Method 300 then proceeds to step 314, where a check is performed by the infraction detection device 20, when it queries the parking locations database 50 to determine whether parking is permitted at the location at which the vehicle is parked. The parking location database 50 is queried based on the positional information provided by the positioning system 22. If parking is not permitted at any time or any other conditions at this particular location, method 300 proceeds to step 316, where the images and identifiers are recorded in the vehicle tracking database 56 and where an infraction alert is then issued. The infraction alert, in an exemplary embodiment of the invention, is an audible alarm generated by the device 20, that signifies to the enforcement officer, that an infraction has occurred, and that an infraction citation (parking ticket) should be issued to this particular vehicle. Method 300 then proceeds to step 318 where a parking infraction notice is issued. The process by which infraction citations are issued is explained in further detail below.

If at step 314 it is determined that parking may be permitted at this particular location a check is performed to determine what restrictions are associated with parking at this particular location. At step 320, the parking locations database 50 is queried, to determine the parking restrictions associated with parking at this particular location. If there are no parking restrictions, meaning that parking is allowed on this particular date, at the particular time, without limitations as to the duration of parking or the necessity of an electronic permit, method 300 then returns to step 302.

If at step 320, it is determined that parking is only permitted when the vehicle is in possession of a valid electronic parking permit, method 320 proceeds to step 322. At step 322, a check is performed by the electronic permit system 29 and more specifically the transceiver 100, which in an exemplary embodiment of the invention is an RFID reader, to determine whether a valid transponder is present in the parked vehicle. If a transponder 106 is not present in the parked vehicle, method 300 proceeds to step 316 where an infraction alert is issued. If at step 322 it is determined that a transponder is found, the unique ID associated with the transponder is retrieved, and a check is performed to determine whether the transponder is a valid transponder. At step 324, the fee payment database 52 is queried to determine whether the transponder is valid, based on payment of fees. If it is determined based on the check at step 324 that the transponder is not valid, method 300 proceeds to step 316 where the images and identifiers are recorded, and where an infraction alert is issued. If it is determined at step 324 that the transponder is valid, method 300 then returns to step 302, and processes the next vehicle that is located. Whenever in the course of determining whether a vehicle is parked legally, a transponder 106 is detected, the transaction database 56 is updated accordingly. Before proceeding to the next vehicle for each vehicle that is detected by the infraction detection device 20, the identifiers, location, time and images associated with such a vehicle are recorded in the vehicle tracking database.

Based on the check performed at step 320 there may be other restrictions in place for parking at that specific location, including parking only at certain times of the day, or only for certain lengths of time, with or without a parking permit. If at step 320, it is determined that parking is only permitted for certain, method 300 proceeds to method 350. Method 350 determines whether or not a parked vehicle has exceeded its allowable parking time, and is described in detail below.

Figure 15:
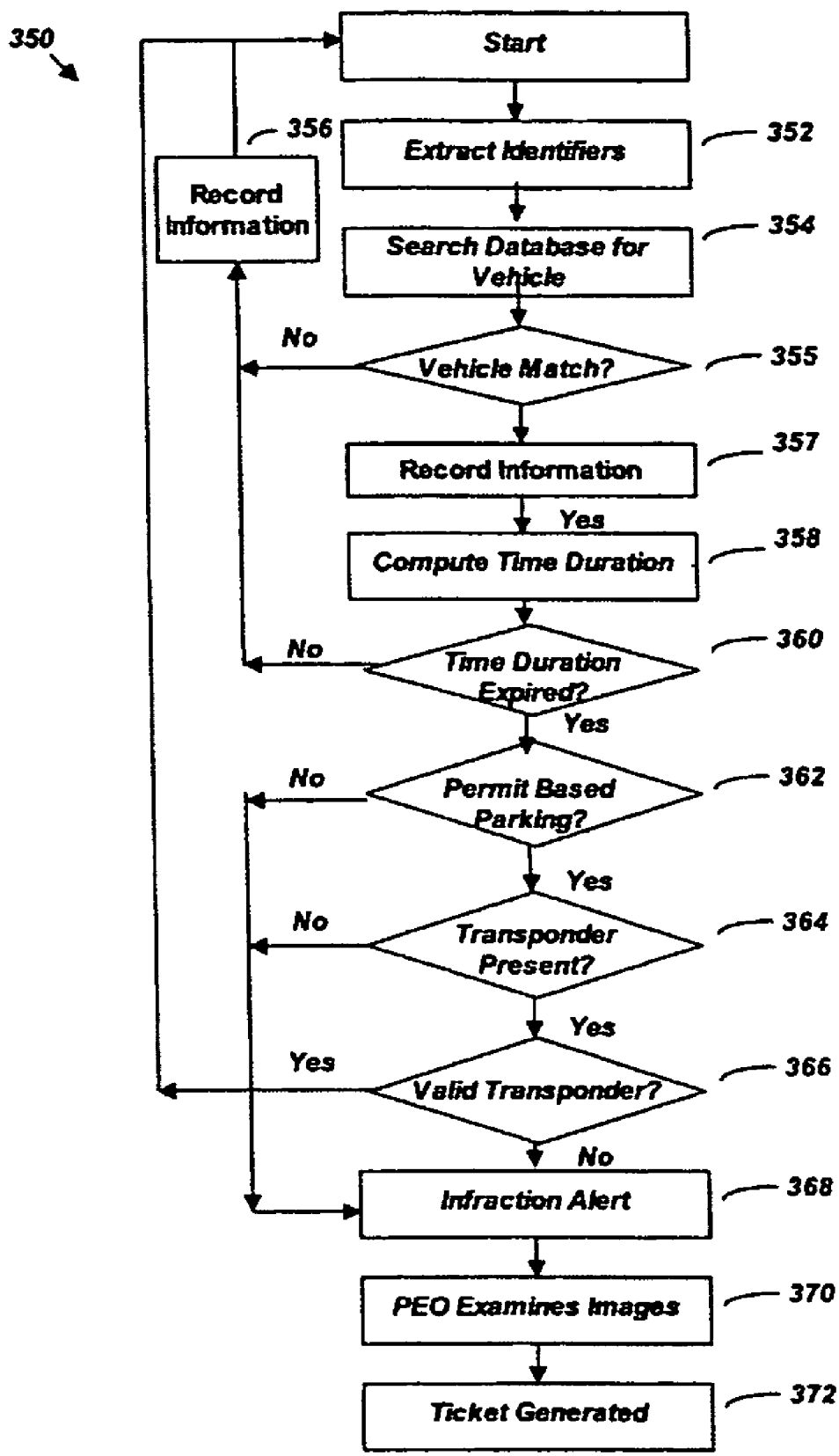
FIG. 15 is a flowchart illustrating the steps of a parking time duration method.

Reference is now made to FIG. 15, where the steps of a parking time duration check method 350 are shown. The time duration method 350 is used to determine whether a vehicle has been parked at one location for longer than the allowable time. Many roadways 10 allow for parking for certain time durations at certain off peak hours.

Method 350 begins at step 354 where the identifiers associated with the vehicle 12 that were determined at step 312 are used to search the vehicle tracking database 56 to determine if this particular vehicle may be found in the vehicle tracking database 56. In an exemplary embodiment of the invention, the first criteria used to determine whether the vehicle may be found in the vehicle tracking database 56 are the location co-ordinates. If the location co-ordinates are similar, meaning that a vehicle was recorded as being parked at the same co-ordinates the matching algorithm that is employed then proceeds to attempt to match the identifiers, including the length, colour and contour measurements. The matching algorithm does not rely on the license plate of the vehicle to determine whether a match has been made. Had license plate recognition been relied on, it would be necessary to capture license plates of all the vehicles that the enforcement vehicle passes, and license plate recognition is inefficient as it is prone to error and is hampered by inclement weather conditions and attempts to obscure license plates. Also, when vehicles are parked in very close proximity to one another, it may not be possible for the license plate image to be captured. Therefore, by relying on the identifiers associated with the vehicle, including, length, colour, and shape, the accuracy of a match is increased. To determine whether a vehicle has been found at the same location, a probability is first determined. The probability of a vehicle of a given colour of a certain size is first determined. For example, the probability of observing a black vehicle is determined to be approximately 12%, and a vehicle of size 4.8 M with a variance of +−5 CM is 10%. Therefore, the probability of observing a car with those probabilities twice in the same locations is determined by the following equation:

$$(P_c * P_s) * (P_c * P_s) \tag{1}$$

where $P_c$ is the probability of a vehicle having a specific colour, and $P_s$ is the probability of a vehicle having a specific length. The probabilities representing vehicle length and colour may be determined by the results found while the parking enforcement vehicle in on patrol, which may be combined with probabilities as determined from published reports.

Method 300 then proceeds to step 355, where a check is performed to determine whether a match has been found. If at step 355 it is determined that a match has not been found, and therefore that the vehicle was not previously found in the same location, the time, location, images, and identifiers associated with the vehicle are recorded in the vehicle tracking database 56 at step 356. If at step 355 it is determined that a vehicle match has been found, meaning that the same vehicle as determined by the identifier matching was previously seen at the same location, method 350 proceeds to step 357. At step 357, the $T_2$ time and identifiers field have the appropriate data stored within them in the vehicle tracking database 56.

At the conclusion of step 357, the vehicle tracking database 56 for the particular vehicle of interest will contain a database entry, where the vehicle has been recorded as being present in the same location at two distinct times. Method 350 then proceeds to step 358, where the time interval during which the vehicle has been observed as being parked in the same location is computed and stored in the vehicle tracking database 56. Method 350 then proceeds to step 360, where a check is performed to determine whether the allowable duration of parking has been exceeded. The parking information database 52 contains information pertaining to the duration of parking that is allowed. In alternative embodiments, the parking enforcement officer may be able to specify a parking time duration. If at step 360, it is determined that the duration of time for which the vehicle has been parked exceeds the allowable time, method 350 proceeds to step 362. If at step 360 it is determined that the time duration has not expired, method 350 returns to the start, and awaits processing of the next vehicle detected by the infraction detection device 20.

At step 362, a check is performed of the parking locations database to determine whether this location allows for vehicles to exceed parking durations if they possess a valid electronic permit. If at step 362 it is determined that this location does not provide for such allowances, method 360 proceeds to step 368 where an infraction alert is issued. If at step 362 it is determined that such allowances are provided for, method 360 proceeds to step 364 where a check is performed to determine whether a transponder 106 has been detected on the vehicle 12. If a transponder 106 is found to be present at step 364, method 350 proceeds to step 366 where a check is performed to determine whether the transponder is valid. The determination of the validity status of the transponder is based on the fee payment database 54. If at step 364 it is determined that a transponder 106 is not present, or at step 366 it is determined that the transponder's status is not valid, method 350 proceeds to step 368.

At step 368, an infraction alert is issued to notify the enforcement officer that an infraction has been detected. The enforcement officer then may proceed to stop the vehicle at a convenient and safe location and review the information related to the infraction to confirm that an infraction has taken place. At step 370, information pertaining to the detected infraction is displayed to the enforcement officer, upon the display associated with the detection device.

Figure 16:
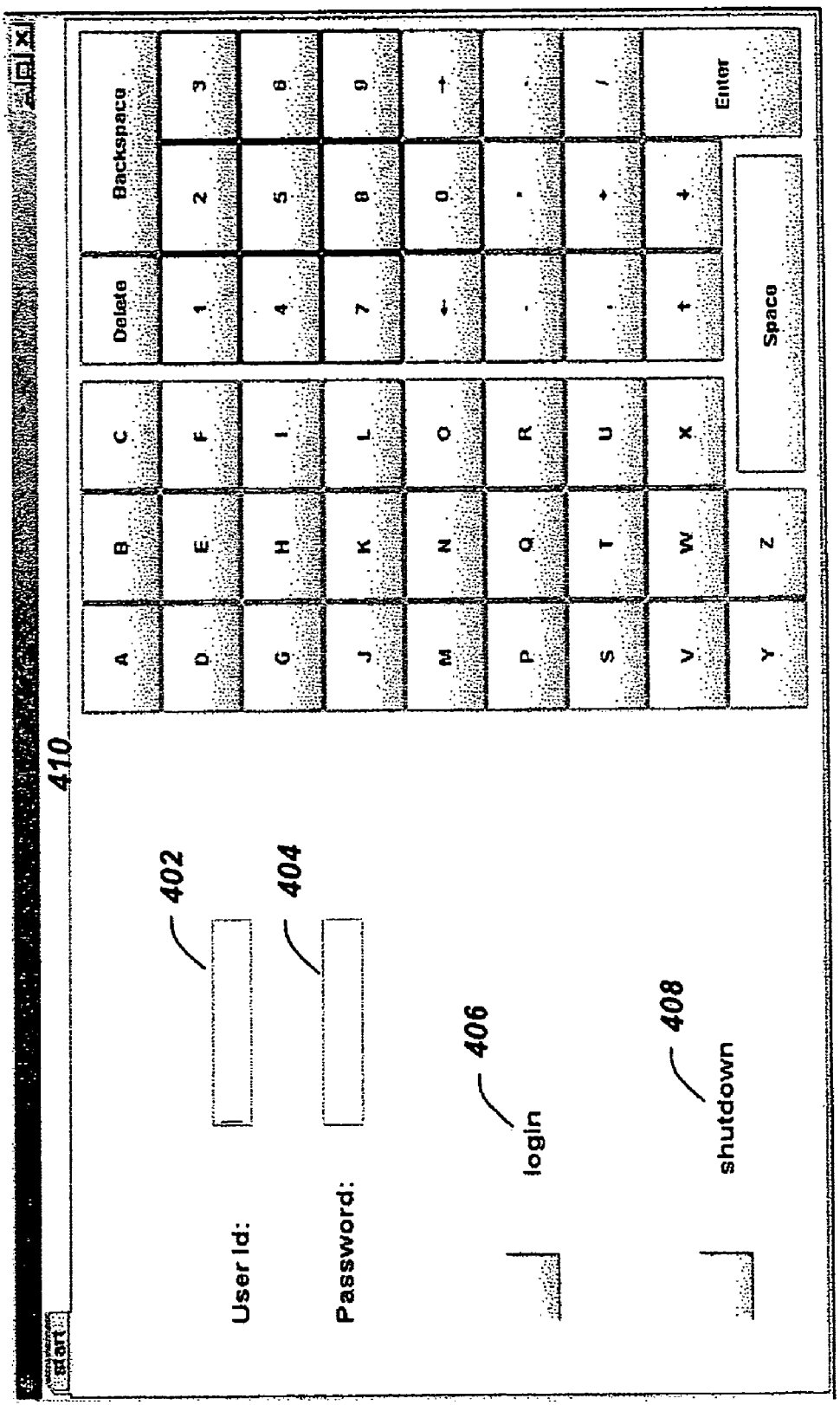
FIG. 16 is a screen shot of an exemplary embodiment of a log in screen.
Figure 17:
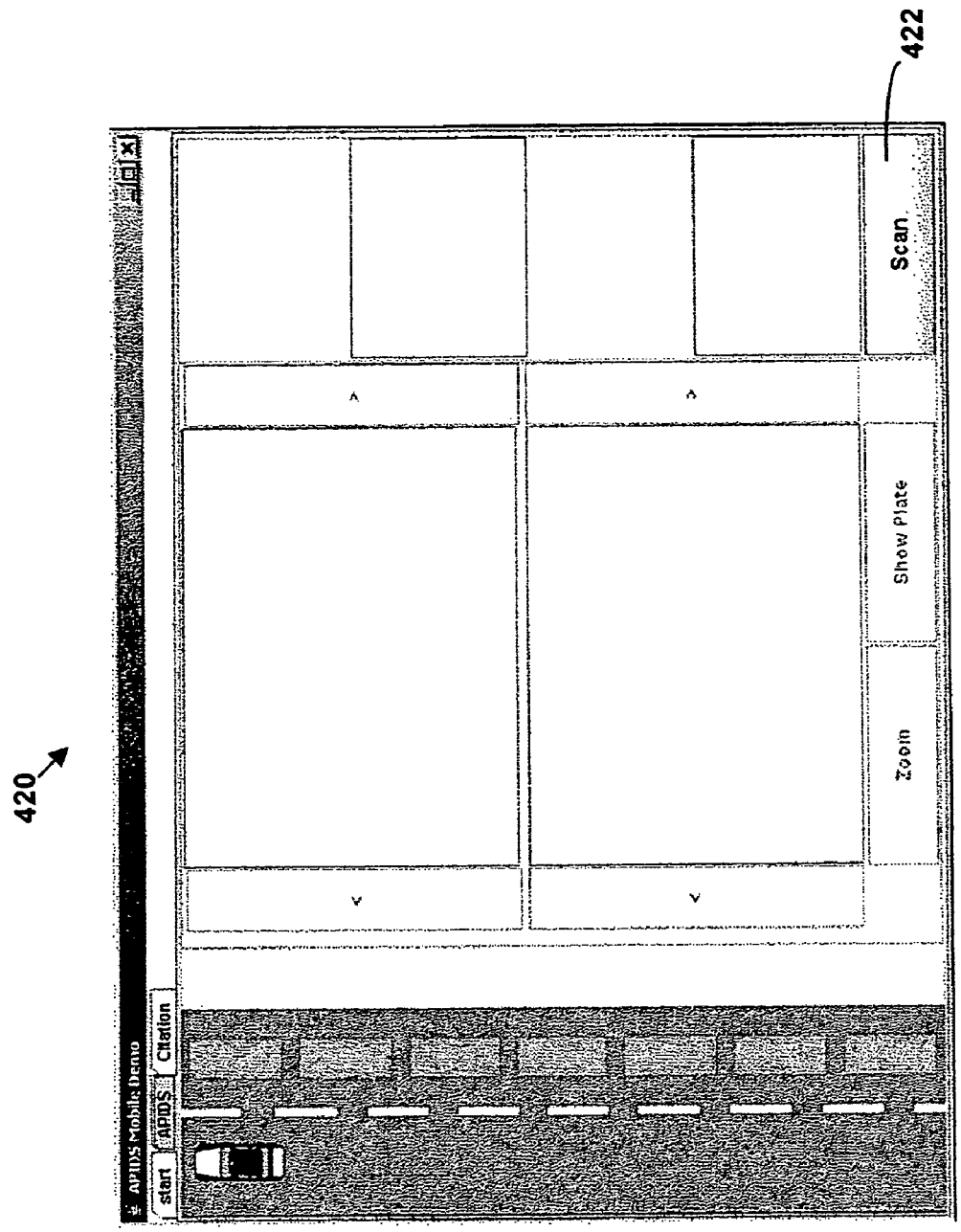
FIG. 17 is a screen shot of an exemplary embodiment of a scan initiation screen.

Reference is now made to FIG. 16-FIG. 20 to better illustrate the operation of the enforcement officer's interaction with the detection device 20. Reference is made to FIG. 16 where a detection device log in screen 400 is shown. Prior to initializing the detection device and beginning a patrol, the enforcement officer will be required to log in to be able to operate the detection device 20. A sample log in screen 400 is shown in FIG. 17. The log in screen 400 asks for a user ID 402, a password 404, and provides a touch screen input mechanism 410. The log in screen 400, in an exemplary embodiment also has a login button 406, and a shutdown option 408.

Reference is now made to FIG. 17, where a scan initiation screen 420 is shown. The screen 420 shown in FIG. 17, is an exemplary embodiment of a screen that allows the enforcement officer to initiate a patrol to detect parking infractions. The officer begins the patrol by clicking the scan button 422, which begins to detect the presence of vehicles that the enforcement vehicle 18 passes. Upon engaging the scan button 422, the user may be presented with further options to determine which side of the roadway 10 they wish to be scanned.

Figure 18:
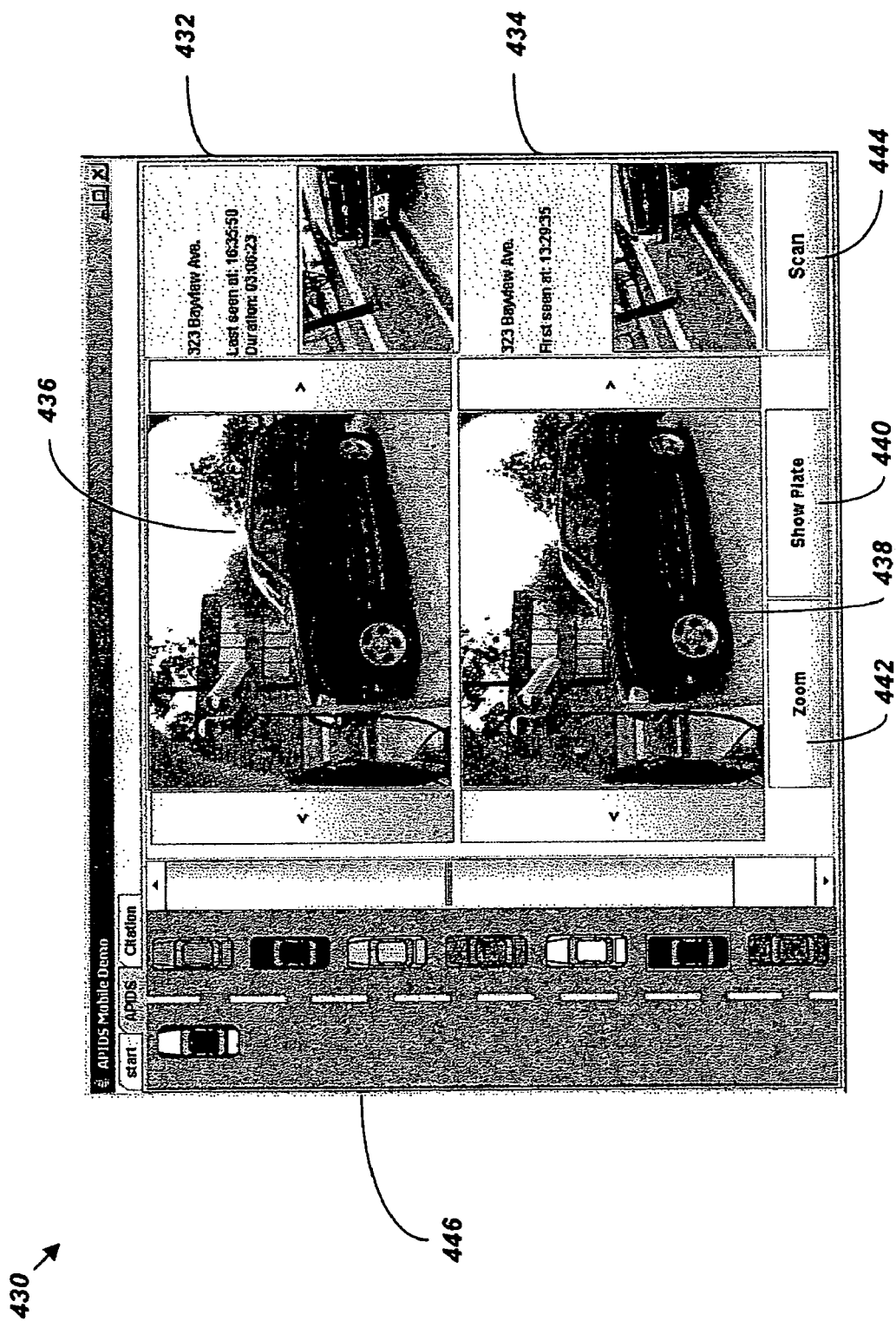
FIG. 18 is a screen shot of an exemplary embodiment of an infraction detection screen.

Reference is now made to FIG. 18, where upon an infraction alert being issued at step 368, the infraction detection screen 430 is displayed to the enforcement officer. FIG. 18 displays an exemplary embodiment of an infraction detection screen 430. Various infraction detection screens may be shown to the enforcement officer, depending on the type of infraction that has been detected. The infraction detection screen 430 as shown in FIG. 18 is shown upon the determination that the allowable parking times have been exceeded. The infraction detection screen provides the enforcement officer with a means by which to exercise a final determination as to whether an infraction has indeed taken place. Therefore, based on the preliminary determination of an infraction having taken place, the infraction detection screen 430 is displayed to the enforcement officer, so that the enforcement officer may make the final determination, which ensures that infraction detection is entirely accurate. In alternative embodiments, the infraction detected by the detection device 20 results in the automatic issuance of a citation, without a need for enforcement officer authorization.

Figure 19:
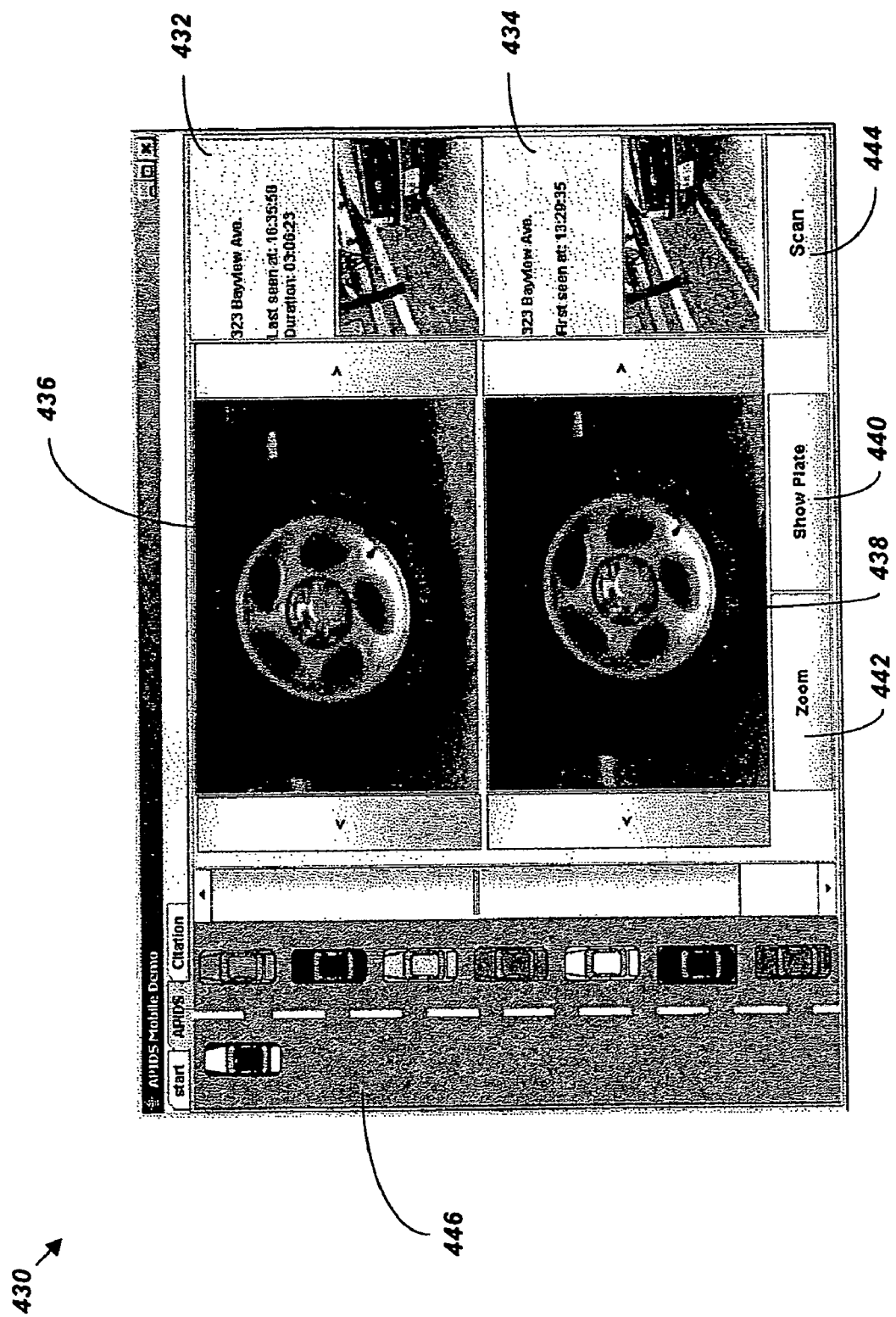
FIG. 19 is an alternative screen shot of the infraction detection screen of FIG. 18.

The infraction detection screen 430 as shown in an exemplary embodiment in FIG. 18 displays to the user the details of the vehicles most recent observation, including its license plate, by the detection device as shown at 432. The detection screen 430 also displays the image associated with the most recent observation of the vehicle as shown at 436. The detection screen also displays information pertaining to the first observation of the vehicle, including its license plate at 434, along with an image of the entire vehicle at 438. Various options are also presented to the enforcement officer, including the option to display the license plate through use of the show plate button 440, the ability to zoom in on any area of the particular vehicle through use of the zoom button. When the parking enforcement officer has finished examining the subject vehicles and taken appropriate action (either ignoring the alert, or issuing a citation) the enforcement officer may resume driving and scanning vehicles through use of the scan button 444. Upon engaging the scan button 444, the user is provided with further options as to determine which side of the roadway they wish to scan, either the right side or the left side. The zoom function allows the enforcement officer the ability to zoom in on area of the images of the respective vehicle as shown in 436 and 438 respectively. By allowing the enforcement officer the ability to zoom in on any particular area of either image, the enforcement officer may undertake a more detailed review of the images of the vehicle to confirm that the vehicles shown in both windows are indeed the same, and were in fact, observed at the same exact location. Reference is made to FIG. 19, where the vehicles as displayed in FIG. 18, and their respective images taken at the two separate instances of time, are zoomed in on. In FIG. 19, the tire of the vehicle is zoomed in on. By zooming in on the tire of the vehicle, the enforcement officer is able to determine whether the vehicle is indeed located at the exact same location, and has not moved even a very short distance. When the enforcement officer wishes to proceed to issue the citation, method 350 proceeds to step 372. At step 372 the particulars relating to the infraction notice that is to be issued are displayed on a citation issuance screen.

Figure 20:
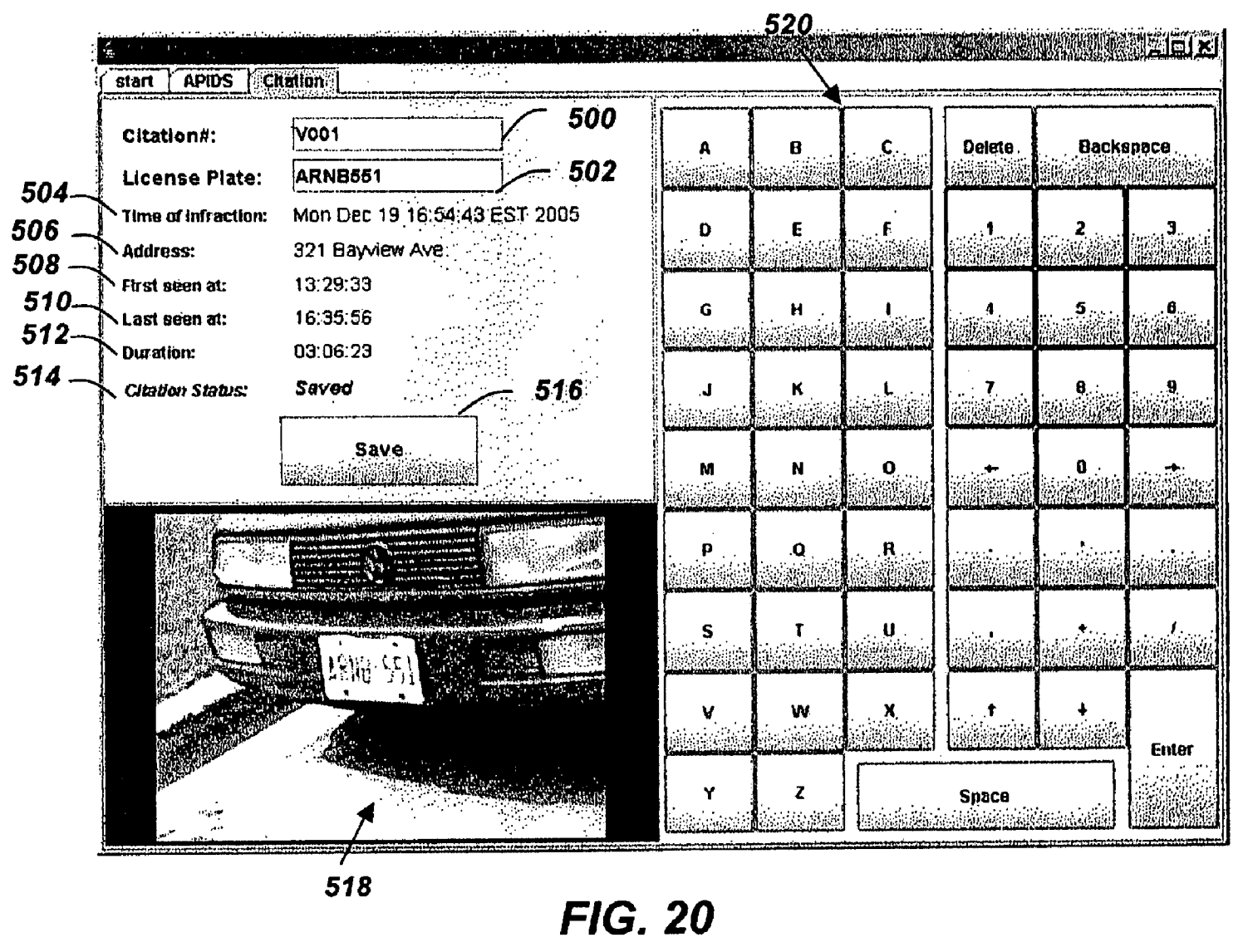

Reference is now made to FIG. 20, where an exemplary embodiment of a citation issuance screen is shown. The citation issuance screen is displayed to the enforcement officer upon the display associated with the detection device 20. The citation issuance screen; as shown in the exemplary embodiment of FIG. 20, comprises a citation number field 500, a license plate field 502, a time of infraction field 504, an address field 506, a time of first observance field 508, a time of last observance 510, a duration field 512, a duration field 514, along with a citation status field 516. The issuance screen also contains a save button 516, a license plate image screen 518 and a touch screen input 520.

The citation number field 500 is used to enter a ticket or citation number that is associated with the citation that is to be issued. The license plate number field 502 is used to enter the license plate associated with the vehicle 12. The license plate is taken from the license plate image screen 518. The time of infraction field 504 is the time at which the citation is being generated. The address field 506 lists the address at which the vehicle was parked. The time of first observance field 508 displays the time at which the vehicle was first recorded as being parked in that location. The time of last observance field 510 is used to display the last instance of time the vehicle was observed as being parked in the same location, and is time that was used to determine whether the duration of allowable parking time had been surpassed. The duration field 512 lists the duration for which the car was observed as being parked in the same location. The citation status field 514 specifies that the citation has been saved. The infraction notice containing the information as displayed on the citation issuance screen may then be printed by the enforcement officer, wherein the officer upon the citation being printed proceeds to take the printed ticket and place it on the windshield of the offending vehicle, or the citations may be saved and printed as a batch, and mailed to the vehicle owner.

Upon the termination of the parking enforcement vehicles patrol, the vehicle tracking database 56 is uploaded from the infraction detection device 20 to the backend office 60. The backend office then analyzes the contents of the respective databases to determine whether any instances of fraud have occurred with respect to the use of the electronic permits. The vehicle tracking database 56 and the transaction database (number) are then analyzed to determine whether any transponders may have been duplicated. If the transponder was identified upon multiple instances during the same patrol, at approximately the same time, however at different locations that may not feasibly be traveled in that time frame, the transponder is marked as potentially being fraudulent.

The present invention has been described with regard to preferred embodiments. However, it will be obvious to persons skilled in the art that a number of variants and modifications can be made without departing from the scope of the invention as described herein.

The invention claimed is:

1. An automated method for detecting parking infractions, comprising the steps of: a) computing one or more measurements associated with a stationary object found at a first location; b) classifying the stationary object as being representative of a vehicle parked at the first location based on the one or more measurements associated with the stationary object; c) capturing one or more images of the vehicle parked at the first location; d) processing the one or more images of the vehicle to extract one or more present vehicle identifiers associated with the vehicle, and recording a time the one or more images were taken, a co-ordinate set associated with the first location and the one or more identifiers associated with the vehicle; e) determining a time duration for which parking is allowed at the first location; and f) comparing the present vehicle identifiers with previously recorded vehicle identifiers associated with the first location to determine if the vehicle has been parked at the first location for a period exceeding the time duration and g) issuing a parking infraction notice if the elapsed time exceeds the time duration.

2. The method of claim 1, wherein the one or measurements associated with the stationary object is a length measurement of the stationary object.

3. The method of claim 1, wherein the one or more measurements associated with the stationary object is a proximity measurement.

4. The method of claim 1, wherein the capturing of the one or more images of the vehicle is performed by a plurality of digital cameras.

5. The method of claim 3, where the plurality of digital cameras are mounted upon a parking enforcement vehicle.

6. The method of claim 1, wherein the one or more identifiers may include one or more of the length of the vehicle, the colour of the vehicle, and the contour of the vehicle.

7. The method of claim 1, wherein the co-ordinate set associated with a first location is provided by a GPS receiver.

8. The method of claim 1, wherein the time duration is determined by querying a parking locations database.

9. The method of claim 8, wherein the parking locations database is stored upon a backend office accessible to an infraction detection device.

10. The method of claim 1, wherein step d) is performed by an infraction detection device.

11. An automated method for detecting parking infractions, comprising the steps of: a) computing one or more measurements associated with a stationary object found at a first location; b) classifying the stationary object as being representative of a vehicle parked at the first location based on the one or more measurements associated with the stationary object; c) capturing one or more images of the vehicle parked at the first location; d) processing the one or more images of the vehicle to extract one or more present vehicle identifiers associated with the vehicle, and recording a time the one or more images were taken, a co-ordinate set associated with the first location and the one or more identifiers associated with the vehicle; e) determining whether parking at the first location is valid only when the vehicle has an electronic permit; f) scanning the vehicle parked at the first location to determine whether the vehicle has an electronic permit and g) issuing a parking infraction notice if the vehicle does not have an electronic permit.

12. A system for detecting parking infractions, the system comprising:
means for performing the steps of a) computing one or more measurements associated with a stationary object found at a first location; b) classifying the stationary object as being representative of a vehicle parked at the first location based on the one or more measurements associated with the stationary object; c) capturing one or more images of the vehicle parked at the first location; d) processing the one or more images of the vehicle to extract one or more present vehicle identifiers associated with the vehicle, and recording a time the one or more images were taken, a co-ordinate set associated with the first location and the one or more identifiers associated with the vehicle; e) determining a time duration for which parking is allowed at the first location; and f) comparing the present vehicle identifiers with previously recorded vehicle identifiers associated with the first location to determine if the vehicle has been parked at the first location for a period exceeding the time duration and g) issuing a parking infraction notice if the elapsed time exceeds the time duration.

13. The system of claim 12, wherein the one or more measurements associated with a stationary object are taken by a proximity detection system.

14. The system of claim 13, wherein the proximity detection system comprises an infrared measurement laser.

15. The system of claim 12, wherein the one or more images of the vehicle are captured by one or more digital cameras.

* * * * *